(12) United States Patent
Ishizu

(10) Patent No.: US 7,532,657 B2
(45) Date of Patent: May 12, 2009

(54) LASER OSCILLATOR INCORPORATING TRANSVERSE MODE ROTATION IN THE LASER RESONATOR

(75) Inventor: Mitsuo Ishizu, Koganei (JP)

(73) Assignee: National Institute of Information and Communications Technology, Incorporated Administrative Agency, Koganei-shi (JP)

(*) Notice: Subject to any disclaimer, the term of this patent is extended or adjusted under 35 U.S.C. 154(b) by 0 days.

(21) Appl. No.: 11/778,304

(22) Filed: Jul. 16, 2007

(65) Prior Publication Data

US 2008/0013588 A1    Jan. 17, 2008

Related U.S. Application Data

(62) Division of application No. 11/115,123, filed on Apr. 27, 2005, now Pat. No. 7,289,548.

(30) Foreign Application Priority Data

Nov. 30, 2004    (JP) .............................. 2004-346468

(51) Int. Cl.
*H01S 3/083*    (2006.01)
*H01S 3/08*    (2006.01)
(52) U.S. Cl. ........................... 372/94; 372/100; 372/101
(58) Field of Classification Search ................... 372/94, 372/100, 101, 99
See application file for complete search history.

(56) References Cited

U.S. PATENT DOCUMENTS 5,027,367 A    6/1991    Rea et al.
5,796,770 A *    8/1998    Gregor et al. .................. 372/75
6,282,224 B1    8/2001    Smith et al.
6,647,033 B1    11/2003    Smith et al.

FOREIGN PATENT DOCUMENTS

| EP | 0 354 985 A2 | | 2/1990 |
|---|---|---|---|
| EP | 0354985 | * | 2/1990 |
| EP | 1 335 459 A2 | | 8/2003 |

OTHER PUBLICATIONS

Edward A. Sziklas, et al., "Mode calculations in unstable resonators with flowing saturable gain. 2: Fast Fourier transform method", Applied Optics, vol. 14, No. 8 Aug. 1975, pp. 1874-1889.

(Continued)

*Primary Examiner*—Armando Rodriguez
(74) *Attorney, Agent, or Firm*—Oblon, Spivak, McClelland, Maier & Neustadt, P.C.

(57) ABSTRACT

A laser oscillator, including an optical resonator, an optical amplifier element on an optical path inside the optical resonator, (i) the optical path in the optical resonator having an even number of optical reflections per resonator circuit or round-trip, (ii) the transverse mode pattern of the laser light in the optical resonator rotating with each resonator circuit or round-trip by a rotation angle other than zero degrees, 90 degrees or 180 degrees, the cumulative rotation angle increasing or decreasing monotonically as the number of circuits or round-trips increases, and (iii) polarization maintaining means that maintains the polarization direction of the laser light through one resonator circuit or round-trip.

5 Claims, 24 Drawing Sheets

OTHER PUBLICATIONS

G.P. Karman, et al., "Fractal Modes in Unstable Resonators", Nature, vol. 402, Nov. 11, 1999, p. 138.

G.P. Karman, et al., "Farctal structure of Elgenmodes of Unstabel-Cavity Lasers", Optics Letters, vol. 23, No. 24, Dec. 15, 1998, pp. 1909-1911.

G.S. McDonald, et al., "Kaleidosope Laser", J. Opt. Soc. Am. B/vol. 17, No. 4, Apr. 2000, pp. 524-529.

* cited by examiner

F I G. 1
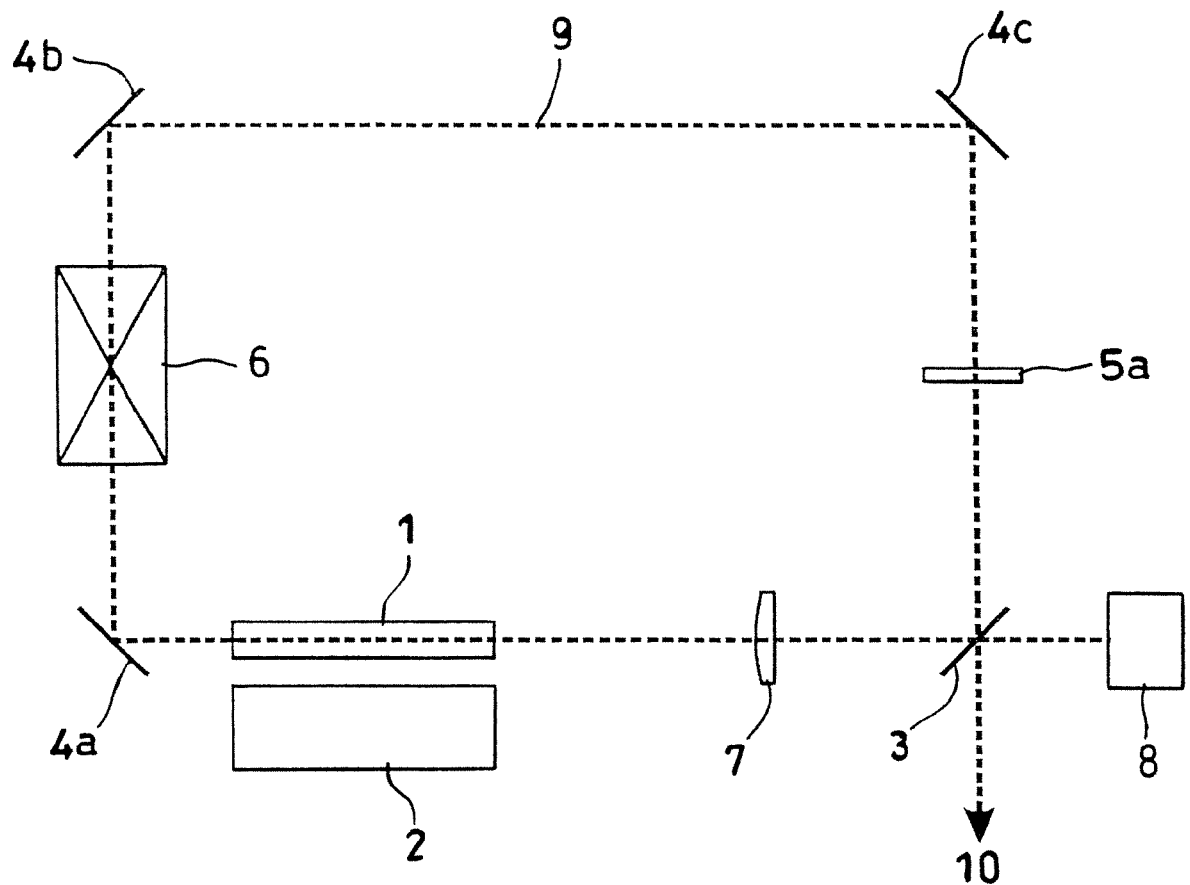
F I G. 2
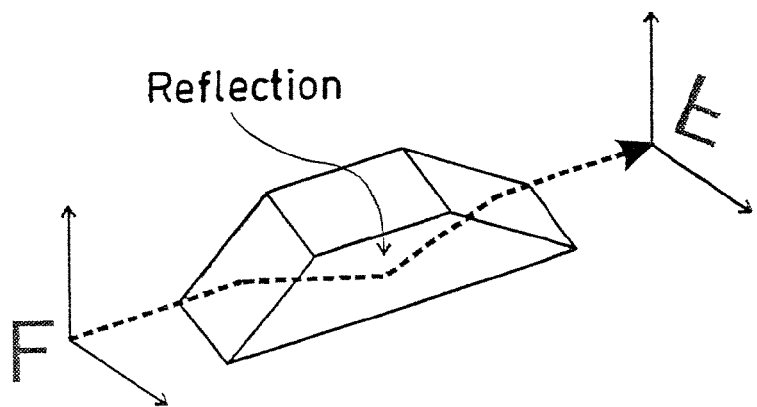

F I G. 8
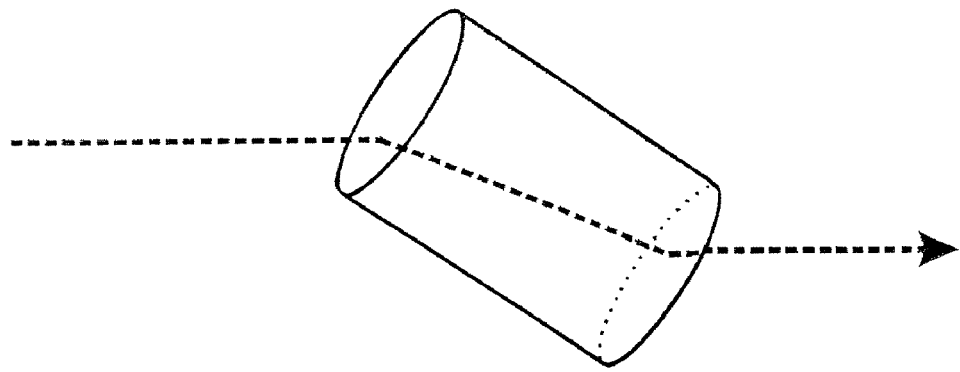
F I G. 9
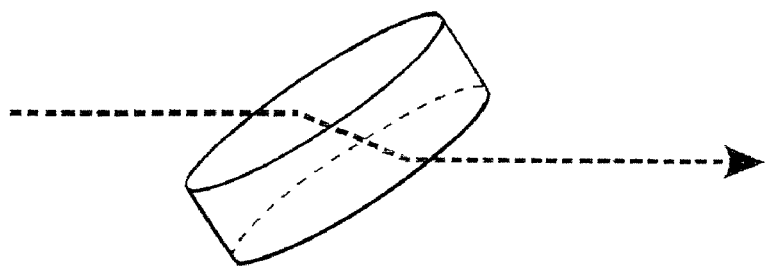
F I G. 10
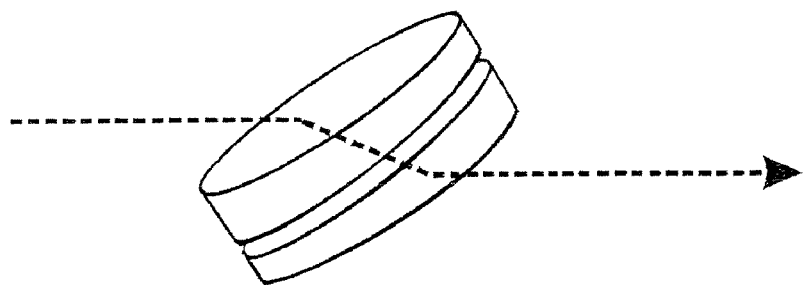

Polarization maintaining prism

LASER OSCILLATOR INCORPORATING TRANSVERSE MODE ROTATION IN THE LASER RESONATOR

CROSS-REFERENCE TO RELATED APPLICATIONS

This application is a divisional of application Ser. No. 11/115,123, filed Apr. 27, 2005 and claims priority to Japanese Patent Application No. 2004-346468, filed Nov. 30, 2004. The entire contents of which are incorporated herein by reference.

BACKGROUND OF THE INVENTION

1. Field of the Invention

The present invention relates to a laser oscillator that makes it possible to stably obtain a laser beam having a fundamental transverse mode pattern or a flat output intensity profile termed a top-hat pattern, in continuous and pulsed oscillation modes, even when there is a spatially non-uniform excitation distribution of the laser medium or the optical characteristics of the laser medium, or of the optical characteristics of the optical elements in the resonator of the laser oscillator.

2. Description of the Prior Art

Generally, a ring resonator or a Fabry-Perot resonator is used to form a stable optical resonator of a laser oscillator. The resonant mode of these resonators is a Hermite-Gaussian mode, denoted as $TEM_{mn}$, where m and n signify a radial mode number and an azimuthal mode number for a round laser beam. The fundamental transverse mode is $TEM_{00}$ mode, which is a Gaussian beam, considered the best oscillation mode because it possesses the smoothest intensity distribution and high convergence.

In TEM mode, the optical wavefront coincides with the surface shapes of the reflecting mirrors at each end of the resonator. This means that a light beam reflected at a point on the mirror will return back to this point after a round trip in the resonator ignoring the beam divergence caused by diffraction. In other words, the laser beam in the resonator is localized spatially within the beam cross-section. Also, the excitation distribution of the laser medium used in the laser oscillator, the refractive index distribution of the optical elements and other such spatial distributions, also birefringence and the like caused by thermal distortion in the laser rods, has a close correspondence to the amplitude-phase distribution of the laser light in the resonator.

This means that if the spatial characteristics of the laser medium or optical elements are non-uniform, the amplitude-phase distribution of the laser beam will also be non-uniform, distorting the beam wavefront and giving rise to corresponding higher-order transverse mode oscillations in laser oscillators. This being the case, much effort has been devoted to eliminating non-uniformity in the optical characteristics produced in the laser medium.

In the case of solid-state lasers, for example, the laser rods are inevitably required to be as uniform as possible optically. Also, to obtain fundamental transverse mode oscillation, the excitation distribution in the laser rod is required to be at least a flat or Gaussian function type. For this, it has been necessary to use a plurality of exciting light sources to realize uniform excitation. Moreover, when the solid-state laser rod is strongly optically excited, it produces a non-uniform refractive index distribution and thermal birefringence, which have to be compensated for by compensating optical system inside the resonator. For the solid-state lasers it has generally been necessary to provide a compensation optical system inside the laser resonator to deal with such non-uniformity.

In addition, Gaussian beam has the maximum intensity at the beam center, so the optical components of the resonator are easily damaged by this center part of the beam. This has been the biggest reason why the optical output of the laser cannot be increased in Gaussian mode. That is what has made it difficult to increase the output power of lasers in fundamental transverse mode.

Another obstacle to realize the uniformities is the fact that, in the case of a solid-state laser, the laser medium is excited by external light sources, so that if a simple exciting light source is used, the excitation density tends to be higher at the irradiated periphery of the laser rod than at the center. On the contrary, as described, the beam intensity is lowest at the periphery. As a result, energy stored by the excitation cannot be efficiently converted to laser light. This has also been another obstacle to boosting the energy conversion efficiency of solid-state laser devices.

In contrast to the above stable Fabry-Perot resonator, laser light obtained from a pulsed laser oscillator, which uses an unstable Fabry-Perot resonator, exhibits what is called a top-hat pattern of the intensity profile, which is substantially flat from the center to the periphery. This laser beam has the same good convergence like a Gaussian beam. In addition, beam energy can be increased without loss of lasing stability, giving it very good quality for applications such as machining and scientific research. As described in the article "Mode calculations in unstable resonators with saturable gain, 2: Fast Fourier transform method," E. A. Sziklas, et al., Applied Optics, Vol. 14 (8), pp. 1874-1889 (1975) [Reference 1], top-hat mode has been thought to be based on TEM mode in the vicinity of the beam axis. However, according to the recent research described in "Fractal modes in unstable resonators," G. P. Karman, et al., Nature, Vol. 402, p. 138 (Nov. 11, 1999) [Reference 2], and "Fractal structure of eigenmodes of unstable-cavity lasers," G. P. Karman, et al., Optics Letters, Vol. 23 (24), pp. 1909-1911 (1998) [Reference 3], the intensity distribution exhibits a highly fractal property, and according to "Kaleidoscope laser," G. S. McDonald, et al., Journal of the Optical Society of America B, Vol. 17, No. 4, pp. 524-529 (2000) [Reference 4], laser intensity distributions obtained by numerical calculation exhibited a fractal structure. From these articles it is convinced that a top-hat mode differs from the TEM modes. Performances of a laser emitting a beam output of top-hat pattern in continuous or pulsed oscillation modes using other optical resonators than the unstable FP resonator is expected to be improved in conversion efficiency and beam quality and stability and the like.

Previously, the stable existence of a top-hat mode in a resonator was impossible to make. Even if a light wave of flat intensity profile is generated at an instant in a stable Fabry-Perot resonator, diffraction of light will strongly modify the top-hat profile of the amplitude-phase distribution only in one round-trip of the resonator, making it impossible to sustain the initial intensity profile.

An object of the present invention is to provide a laser oscillator, in which a laser beam by continuous or pulsed oscillation exhibits a uniform intensity profile or the fundamental transverse mode and also the conversion efficiency from exciting light to the laser output energy is high.

In other words, an object of the present invention is to provide a laser oscillator that makes it possible to obtain a fundamental transverse mode or top-hat mode of a laser beam in continuous oscillation or in pulsed oscillation with high stability and efficiency.

SUMMARY OF THE INVENTION

To attain the above object, the present invention provides a laser oscillator comprising an optical resonator, an optical amplifier element on an optical path inside the optical resonator, (i) the optical path of the optical resonator having an even number of reflections per resonator circuit or round-trip, (ii) the transverse mode pattern of the laser beam in the optical resonator rotating with each resonator circuit or round-trip by a rotation angle other than zero degrees, 90 degrees or 180 degrees, the cumulative rotation angle increasing or decreasing monotonically as the number of the circuits or round-trips increases, and (iii) polarization maintaining means that maintains the polarization direction of the laser beam through one resonator circuit or round-trip.

The laser oscillator of this invention has an optical resonator in which, when the laser beam makes one circuit of a ring resonator or one round-trip in the case of a crossed Porro (or right-angle) prism type resonator, the polarization state is maintained but the transverse mode pattern is rotated. The transverse mode pattern can be rotated by using a ring resonator having an image rotating element, or a nonplanar type ring resonator in which the all optical path is not on a plane, or a prism resonator composed of two opposed Porro (or right-angle) prisms whose ridge lines are crossing. However, in the case of these resonators the polarization direction is rotated along with the image, so a polarizer and a half-wave plate, or a polarizer and Faraday rotator combination is used to maintain the polarization by turning the rotation back. A laser medium excited by an excitation apparatus, or a parametric element excited by a pump laser, is disposed on the optical path of the resonator. Alternatively, the laser oscillator of this invention can be realized by intersecting the optical path of this laser resonator with that of a conventional Fabry-Perot or a planar ring resonator. To couple these resonators a beam-splitter can be inserted at the intersection of the optical axes, or the polarizer of this resonator can be replaced by a beam-splitter to couple this resonator with the conventional resonator. This would make it possible to introduce the transverse mode selection effect provided by the transverse mode-pattern rotation, and laser oscillation can be obtained exhibiting top-hat intensity profile from the conventional laser oscillators in continuous or pulsed mode. One of the laser outputs of the counterclockwise and clockwise rotating beams generated in the ring laser oscillator can be reflected back into the resonator by a reflector and the laser oscillation in this direction is suppressed to obtain the laser oscillation traveling only in the other direction.

The optical amplifier element of this invention can be a laser medium provided with excitation means, or a laser medium provided with excitation means and a nonlinear crystal that generates higher harmonic waves of laser light amplified by the laser medium, or a laser medium provided with excitation means and a parametric optical element excited by the laser light amplified by this laser medium, or a parametric optical element excited by a pump laser disposed outside the optical resonator, or one in which a Raman amplifier element is used instead of a parametric optical element.

The optical resonator of this invention can be a ring resonator including an image-rotating optical element, a nonplanar type ring resonator or a crossed Porro (right-angle) prism resonator, each having an image-rotating function that rotates a transverse mode pattern thereof after one circuit or one round-trip of the resonator.

The polarization maintaining means of this invention that maintains the polarization direction of the light after one circuit or one round-trip in the optical path of the optical resonator is constituted by a polarizer located on the optical path of the resonator that determines the polarization direction.

In another polarization maintaining means of this invention the above polarizer is replaced by a beam-splitter, and a polarizer on an optical path split from this beam-splitter, or a solid-state uniaxial laser medium, determines the polarization direction. Uniaxial laser media have the largest lasing gain for the laser light polarized along a specific crystal axis. This light is preferred to oscillate and determines the polarization of the laser oscillator.

In these polarization maintaining means a quarter-wave plate, a half-wave plate or a Faraday rotator provided on the optical path adjusts the polarization direction.

The optical amplifier element can be coupled to the part that rotates the transverse mode pattern or the part that adjusts the polarization direction by a beam-splitter disposed at the intersection of the optical paths of the resonators.

The optical path of the optical resonator in the present laser oscillator can be comprised of a plurality of optical path segments between reflection points on a plurality of reflectors, that are connected together into a ring, the optical path being formed on a plurality of planes having lines of intersection between the two adjoining planes.

The optical path of the optical resonator in the laser oscillator can be comprised of a plurality of optical path segments between reflection points on a plurality of reflectors that are connected together into a ring, in which a segment of an optical path is located on one plane and replaced by what is equivalent to an optical path formed by a Dove prism.

The optical path of the optical resonator in the above laser oscillator can be one that is equivalent to an optical path comprised of optical path segments on two planes that are connected together into a ring, one of the reflection points is located on a line of intersection between the two planes and other two reflection points located on different planes are connected by a segment including a optical path-shift element.

Alternatively, the optical path of the optical resonator in the laser oscillator can be one that is equivalent to an optical path comprised of optical paths on a plurality of mutually parallel planes that are connected together into a ring, using an optical path-shift element.

A special filter which blocks the light just in the vicinity of the optical axis of the laser light may be inserted into the optical path in the optical resonator of the laser oscillator.

As described in the foregoing, the stable existence of a top-hat mode in a resonator has been impossible to achieve previously. However, with the laser oscillator according to this invention, a laser beam having a top-hat shaped intensity profile can be stably obtained in continuous and pulsed oscillation modes.

Further features of the invention, its nature and various advantages will be more apparent from the accompanying drawings and following detailed description of the invention.

BRIEF DESCRIPTION OF THE DRAWINGS

FIG. 1 shows a ring resonator provided with the basic configuration of the laser oscillator according to the present invention.

FIG. 2 shows a Dove prism used as an image rotator.

FIG. 8 shows a cylindrical prism used as a path-shift element.

FIG. 9 shows a Brewster's window used as a path-shift element.

FIG. 10 shows a double wedge window used as a path-shift element.

DESCRIPTION OF THE PREFERRED EMBODIMENT

Figure 3:
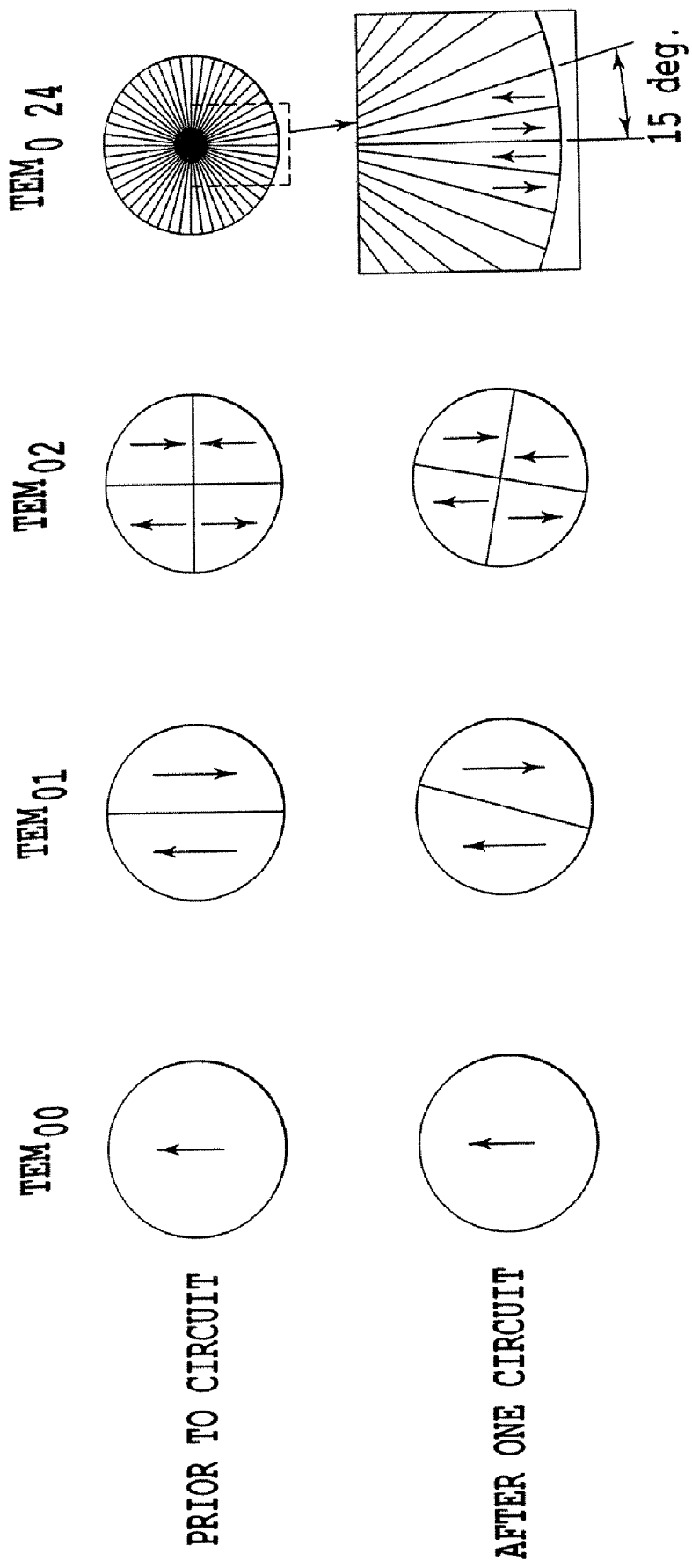
FIG. 3 shows the TEM mode rotation.

Embodiments of the invention will now be described with reference to the drawings. In the explanations, parts that are the same or similar are denoted using the same symbols, unless stated otherwise.

EXAMPLE 1

FIG. 1 shows a ring resonator having the basic configuration of the laser oscillator according to the present invention. This ring resonator comprises a polarizer 3 and a plurality of reflecting surfaces 4a, 4b and 4c, and the optical path 9 of the resonator has the square shape depicted. The ring resonator also has an image rotator 6, a half-wave plate 5a and a lens 7 arranged on the optical path. The resonator and a laser medium 1 and a laser excitation apparatus 2 located on the optical path constitute a laser oscillator.

Figure 19:
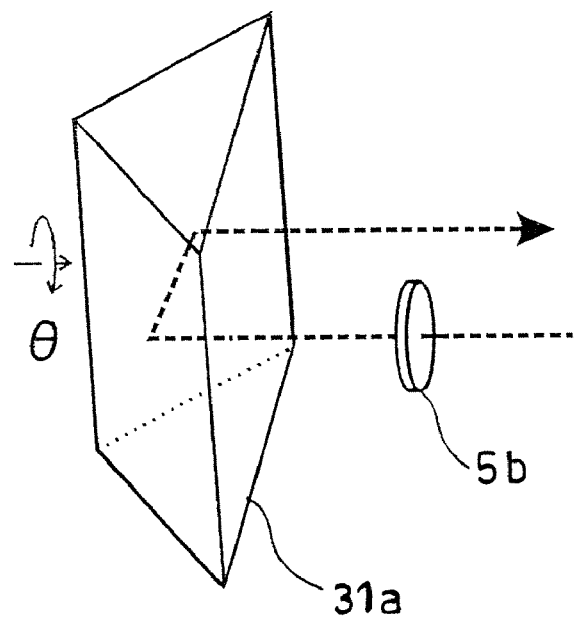
FIG. 19 shows a retro-reflector comprising of a right-angle prism and a half-wave plate.

The image rotator 6 rotates the transverse mode pattern of the passing laser beam about the optical axis. The image rotator 6 may be a Dove prism that internally reflects the beam once, such as the one shown in FIG. 2, or a right-angle prism that reflects the beam twice, deflecting the beam 180 degrees, such as shown in FIG. 19. A Dove prism is comprised of two incident faces at the Brewster's angle through which the light passes, and of one total reflecting face. A Faraday rotator or quarter-wave plate can be used instead of the half-wave plate 5b. As in the case of an ordinary optical resonator, the lens 7 is used to set the resonator as a stable or unstable resonator and to control the resonator's beam parameters such as beam waist and beam divergence. This lens is used as required, and in some cases a plurality of lenses is used.

The optical path of the resonator of FIG. 1 will now be explained, starting with a case in which the laser beam goes around clockwise, with respect to the drawing. First, the beam starts out as a linearly polarized beam that is polarized perpendicularly to the drawing sheet reflected by the polarizer 3, passes through the lens 7, which converges or diverges the beam, and is then amplified by passing through the laser medium 1. The beam then passes through the image rotator 6, whereby the transverse mode pattern and polarization direction are rotated about the optical axis. The beam then passes through the half-wave plate 5a, which returns the polarization direction to the original perpendicular to the drawing sheet. That is, the orientation of the optical axis of the half-wave plate is set so that the laser beam is totally reflected by the polarizer 3. By doing this, after the laser beam has traveled around the resonator once, only the transverse mode pattern is rotated around the optical axis.

Each time the laser beam makes a circuit around the resonator, it is reflected an even number of times, counting all the times whether it is internally reflected by the image rotator 6, laser medium 1 and the other optical elements. However, FIG. 1 shows a conceptual resonator in which there is no internal reflection by the image rotator 6 or laser medium 1. When there is an even number of reflections, the transverse mode pattern after a circuit of the ring will be a pattern of a rotated erect image. Also, as described above, the polarization direction is retained. The beam is not emitted outside the resonator from the polarizer 3, but is amplified by the laser medium 1 to maintain the laser oscillation. This is also the case when the beam travels counterclockwise around the resonator.

Figure 13:
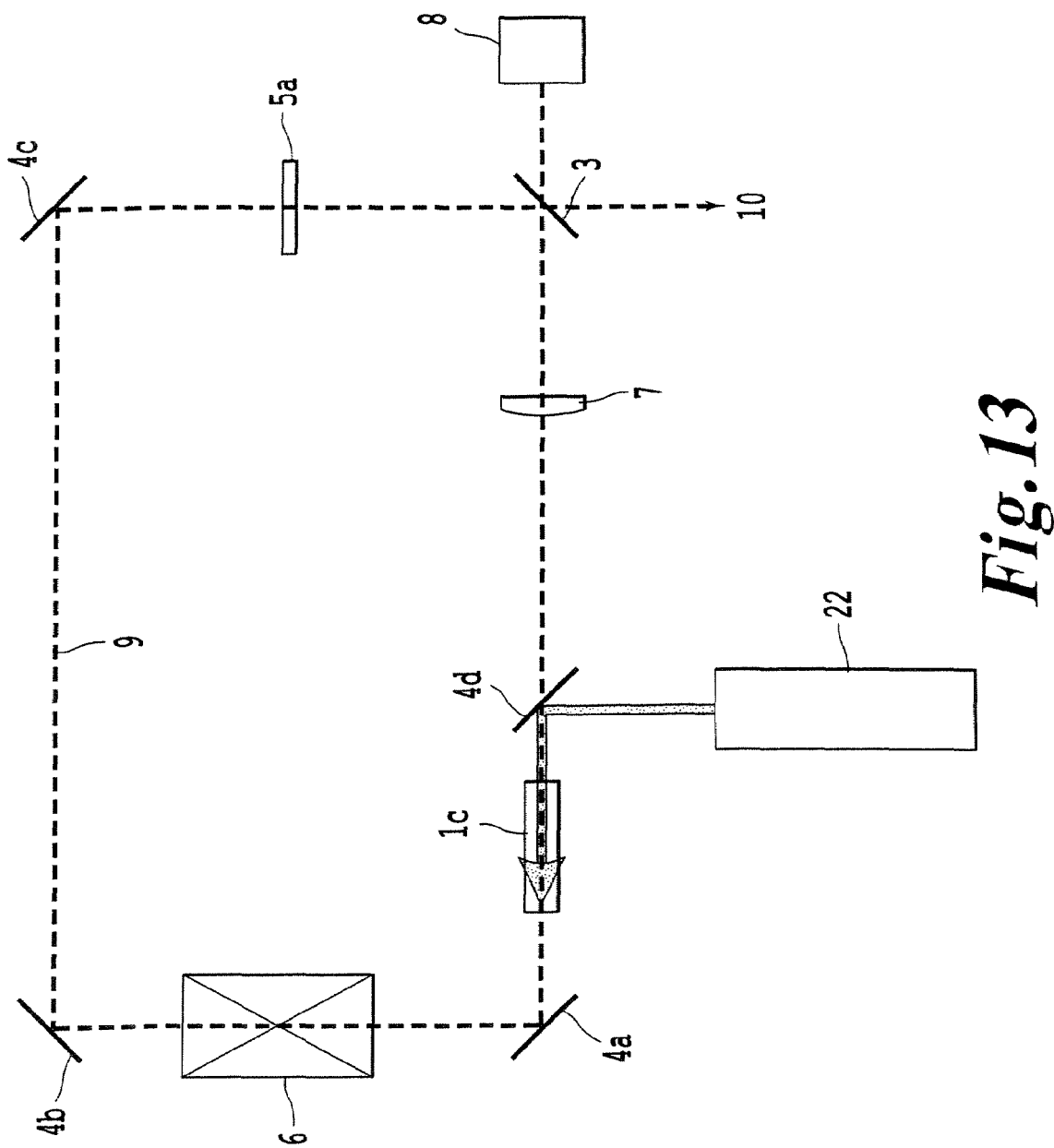
FIG. 13 shows an example of a parametric oscillation apparatus configuration.
Figure 14:
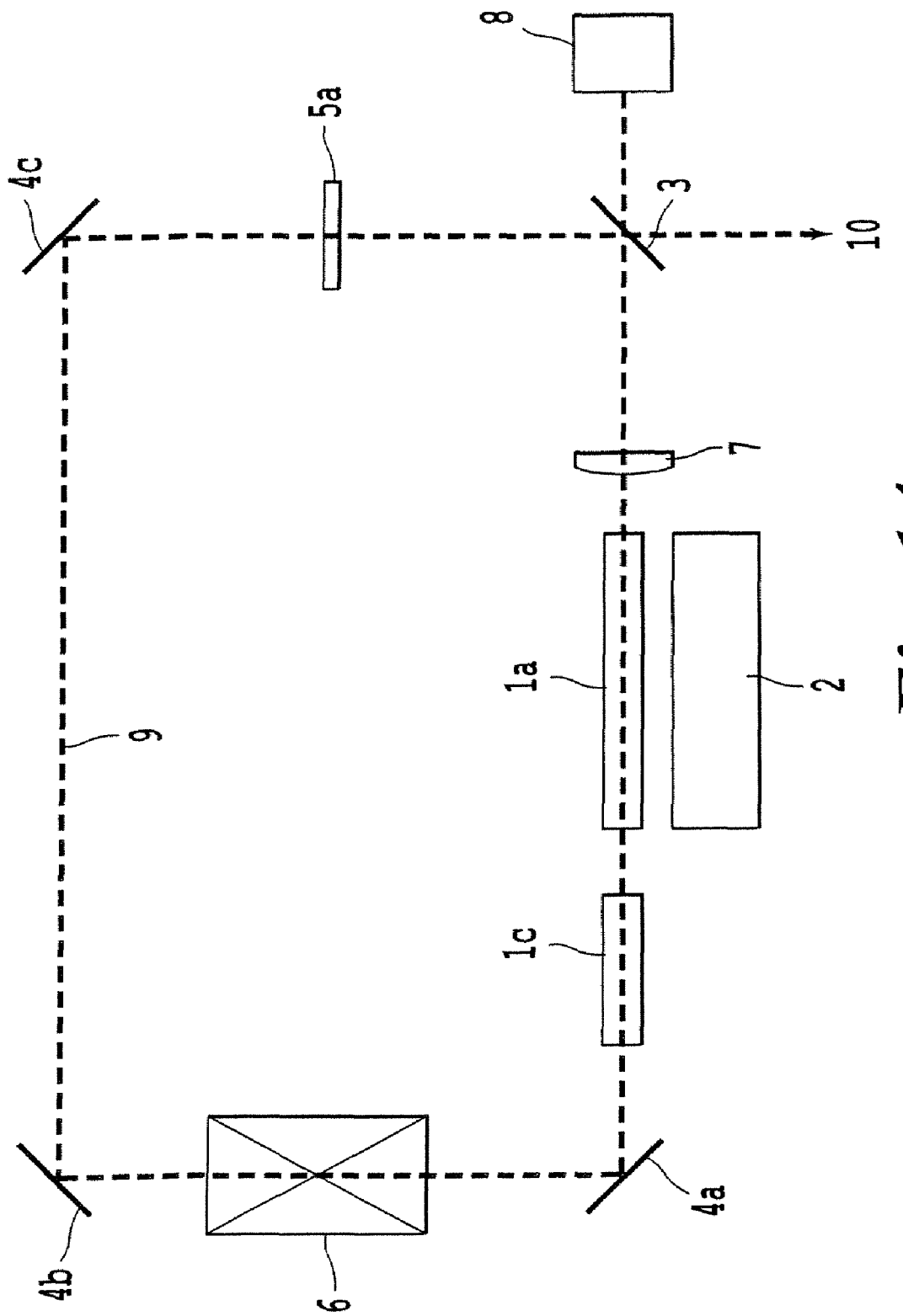
FIG. 14 shows an example of another parametric oscillation apparatus configuration.
Figure 33:
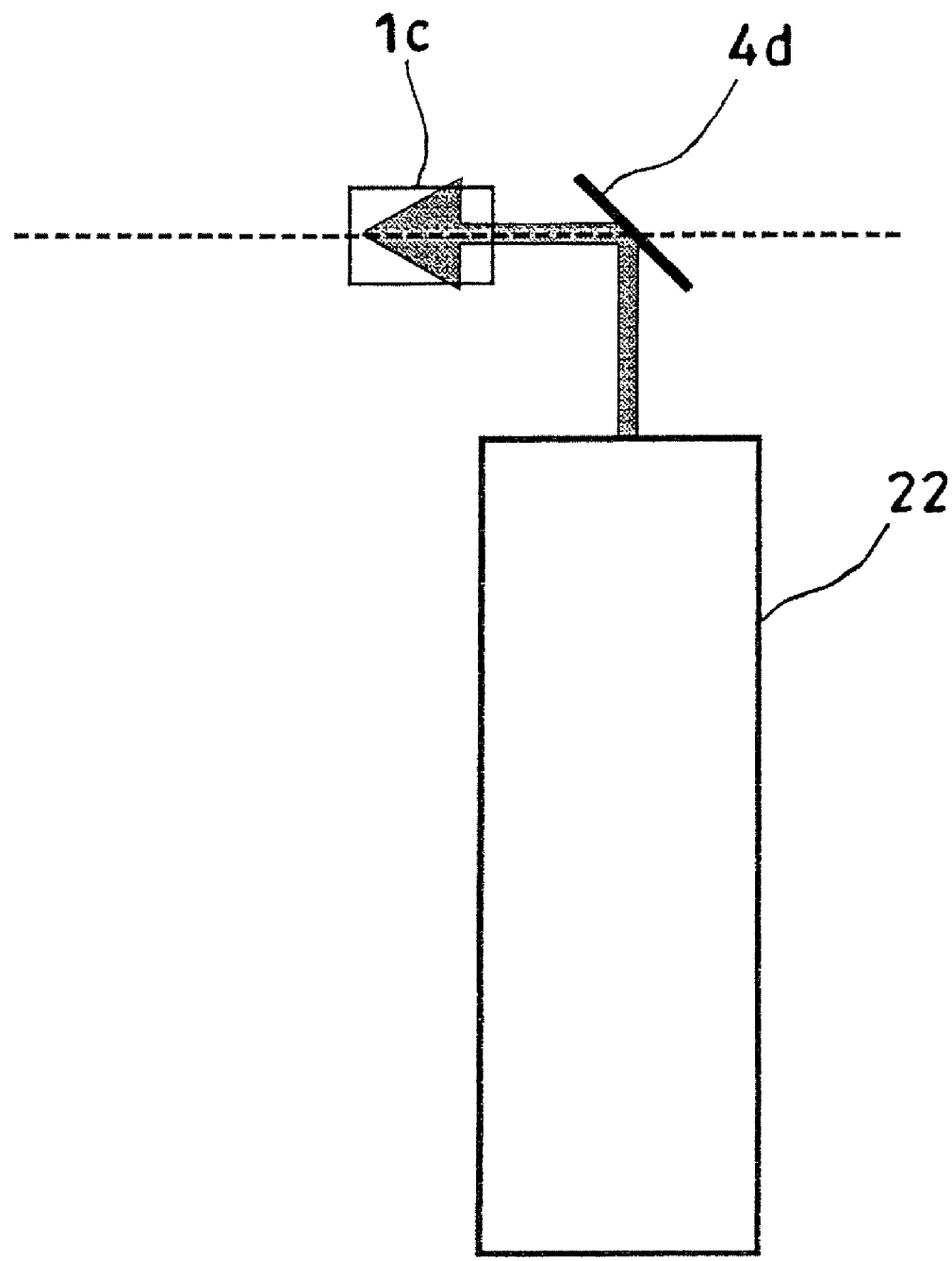
FIG. 33 shows a parametric optical element provided in a parametric oscillator apparatus.

The parametric optical element 1c shown in FIG. 33 may be used as the laser medium 1. FIG. 13 shows a parametric oscillation apparatus incorporating this element. This optical element is excited using a pumping laser 22. As shown by the drawing, the pumping light is guided from the pumping laser 22 by a reflector 4d, which reflects the pumping light and transmits the amplified light. The reflector 4d may be replaced by a polarizer, in this case the pumping laser beam can be a linearly polarized beam reflected by the polarizer. Alternatively, one of the resonator reflectors transmits the pumping light and reflects amplified light by the parametric element, and the pumping light from the pumping laser is guided to the parametric element through this reflector. In these configurations the amplified light or the exciting light resonates in the resonator. Alternatively, as shown in FIG. 14, both of the laser medium 1a excited by an excitation apparatus and parametric element 1c may be disposed together inside the resonator and the parametric optical element is pumped by the light amplified by the laser medium. A non-linear optical crystal for generating higher harmonic waves or a Raman amplifier element can be substituted for the parametric element. Doing this makes it possible to generate a higher harmonic wave of the laser light or Raman emission.

To obtain the laser output beam 10 in the configuration of FIG. 1, the optical axis of the half-wave plate 5a is rotated around the optical axis from the above position. Thus, polarization direction of light passing through the half-wave plate 5a is slightly inclined from the perpendicular with respect to the plane of the page, so there is a slight generation of linearly polarized components in the direction of the drawing sheet that can pass through polarizer 3, with the light thus transmitted constituting the output beam 10. In cases in which a Faraday rotator or a quarter-wave plate is used instead of the half-wave plate, light reflected by the polarizer 3 is polarized perpendicular to the drawing sheet, and repeats the next circuits. This light is amplified by the laser medium and maintains the laser oscillation. In the same way, a laser beam is simultaneously oscillated in the counterclockwise direction and is output through the polarizer 3.

Alternatively, not rotating the half-wave plate 5a and replacing one of the reflecting surfaces of the optical resonator by a partially reflecting surface makes it possible to output through this surface clockwise and counterclockwise laser beams that are polarized perpendicular to the drawing sheet.

Also, a laser beam circulating counterclockwise in the configuration shown in FIG. 1 is emitted as an output beam from the polarizer 3 which is polarized within the drawing sheet, and will then be reflected back into the resonator by a reflector 8 without being reflected by the polarizer 3. This laser beam circulates clockwise, and part of this light is changed to light polarized perpendicularly to the drawing sheet by transverse mode rotation and the half-wave plate 5a. Thereby, a strong coupling takes place between the beams in the resonator circulating counterclockwise and clockwise, while at the same time the gain of the clockwise laser oscillation is enlarged more than that of the counterclockwise laser oscillation. As a result, counterclockwise laser oscillation is suppressed, so only unidirectional oscillation is achieved, in the clockwise direction.

The polarizer 3 can be replaced by a partially reflecting mirror if the half-wave plate 5a has not been rotated to obtain laser output through the polarizer 3. This makes it possible for light to circulate in the resonator polarized parallel or perpendicular to the drawing sheet, thereby making it possible to obtain the laser output polarized randomly through the partially reflecting mirror. Moreover, by slightly rotating the half-wave plate 5a from the above state any resonance of all the transverse modes, including the fundamental transverse mode, is inhibited and any laser oscillation cannot start. This mechanism is described in the following section.

Generally, the condition for a stable resonant mode to exist in an optical resonator is that the amplitude-phase distribution of light traveling after one circuit or a return trip in the resonator coincides with the original amplitude-phase distribution, whereby the amplitude-phase distribution in the optical resonator is preserved. On the other hand, the feature of the optical resonator in this invention is that the transverse mode pattern of the laser light circulating in the resonator is rotated after each circuit. Even in the case of the above optical resonator, it is clear that resonance cannot take place unless the optical amplitude-phase distribution is preserved. On this point, if there is transverse mode rotation such as that shown in FIG. 3, in the case of the fundamental $TEM_{00}$ mode the distribution returns to the original distribution after one circuit, but in the case of the higher-order transverse modes such as $TEM_{01}$ or $TEM_{02}$, it does not return to the original distribution nor coincides with any of the distributions the TEM modes after making a circuit.

Very-high-order transverse modes are an exception. If, for example, the angle of transverse mode rotation is set at 15 degrees for each circuit of the resonator by the laser beam, as shown in FIG. 3, in the $TEM_{0\ 24}$ mode obtained from an azimuthal mode number of 360 degrees divided by 15 degrees, the distribution after one circuit coincides with the original distribution, so resonance is possible. Such a high-order mode has a very large beam divergence angle that the resonance is not possible with a laser resonator having an ordinary beam divergence angle. If the above rotation angle is decreased more, it results in a much higher-order TEM mode to resonate. It can be understood that at rotation angles of zero and 180 degrees, resonance can also take place in $TEM_{01}$ mode, and in the case of an angle of 90 degrees, in $TEM_{02}$ mode.

From the above, the effect of this invention is to disable resonances in almost all transverse modes except for the fundamental transverse mode, making it very easy to oscillate only in the fundamental transverse mode for laser oscillations. For this, the rotation angle of the transverse modes per circuit of the resonator is preferred to be an angle other than zero, 90 or 180 degrees.

With regard to the image rotating type resonator of this invention which does not include a polarizer, if the polarization direction of light that makes one circuit of the resonator differs from the original direction, it becomes impossible to keep the amplitude-phase distribution of that light as described in the above. At each time that this light circulates the resonator, the polarization direction thereof continues to rotate in one direction, so it cannot resonate in the resonator. Even if laser media in the resonator are combined, laser oscillation cannot arise because there is no resonant light mode.

A Fabry-Perot resonator basically consists of a combination of spherical mirrors or spherical lenses, and therefore it has the same properties of that of an imaging optical system. In such laser resonators different optical parameters may be allowed in orthogonal directions in the cross-section of the laser beam, but the TEM mode is symmetric when it is reversed vertically and transversely, or rotated in 180 degrees. For example, if the right end of the Gaussian beam oscillating in the laser resonator is masked, the transverse mode pattern will be missing from both right and left sides.

If the angle of transverse mode rotation per circuit of the resonator is set to zero degrees, or 90 degrees, or 180 degrees, the symmetry of that resonant mode will be identical to the point symmetry of a Fabry-Perot resonator and there will be conventional TEM mode oscillation. However, if any other rotation angle is used, the symmetry of the resonant mode changes from the point symmetry of the TEM mode to the rotational symmetry, making TEM mode oscillation impossible. As shown in FIG. 3, in the case of $TEM_{01}$ mode or $TEM_{02}$ mode, if the angular rotation per circuit of the resonator is anything other than 180 degrees, the result won't coincide with the original transverse mode pattern, so oscillation cannot take place. With this resonator, resonance can only take place in a mode having an invariant amplitude-phase distribution against the mode rotation; herein, this mode will be called image-rotating mode.

The boundary of the transverse mode rotation angle at which the TEM mode changes to the image-rotating mode varies depending on the beam diameter and the length of the resonator, but generally is an angle that departs by ±0.5 degrees or more from zero, 90 or 180 degrees. If the rotation angle exceeds that, the symmetry of the resonant mode will differ from the point symmetry of the TEM mode, making resonance impossible in TEM modes other than the fundamental transverse mode. To generate image-rotating mode oscillation, the resonator has to be configured with the image rotator adjusted so that the transverse mode rotation angle does not enter the TEM mode angle region. If a Dove prism is used, the image rotation angle will be twice the prism rotation angle, so it is only necessary to ensure that the angle between the internal reflecting surface thereof and a plane that is perpendicular or parallel or at 45 degrees to the drawing sheet of the FIG. 1 is not less than ±0.25 degrees.

In the resonator thus configured, resonance is only possible in a mode equivalent to a $TEM_{00}$ mode. By regulating the resonator beam parameters, it is possible to achieve stable resonance in a top-hat profile mode in which diffracted light from the peripherals of the mode pattern is superposed to form a flat intensity distribution. This light is amplified by the optical amplifier element and extracted as laser output.

This resonator utilizes the above fundamental mode selection and further utilizes the averaging effect based on that the light trajectory over many circuits or round trip in the resonator distributes over whole cross section of the laser beam. To obtain a $TEM_{00}$ mode or a laser beam with a smooth, even intensity distribution, it is not necessary for the TEM mode to be rotated in a large angle each time the light makes a circuit or round trip in the resonator. Instead, it is preferable to use a small rotation each time to provide a smooth superposition on the preceding mode pattern. It is desirable for the image rotation angle per circuit or round trip to be not more than ±5 degrees from zero, 90 or 180 degrees.

The resonator of this invention differs from a conventional resonator in that the resonant transverse mode pattern rotates. What makes this possible is that the reflection points of the resonator, including the reflection points inside optical elements, are not in the same plane. When a Dove prism is used, for example, the internal reflection point of the prism is outside a plane that contains the other reflection points. This means that even if there is no image rotating element, the transverse mode pattern can be rotated as long as the resonator is configured as a nonplanar ring resonator having four or more reflection points that are not in one plane. Also, the number of refraction surfaces in the optical elements of the resonator can be selected as desired, since they do not rotate the transverse mode pattern with themselves although they change the direction of the light rays.

Moreover, the transverse mode rotation of the resonator has an effect of equalizing unwanted amplitude-phase distribution of the laser beam generated by non-uniform qualities of the laser medium excitation distribution and of the characteristics of the optical elements used in the resonator, facilitating the laser oscillation in a good quality transverse mode.

Figure 32:
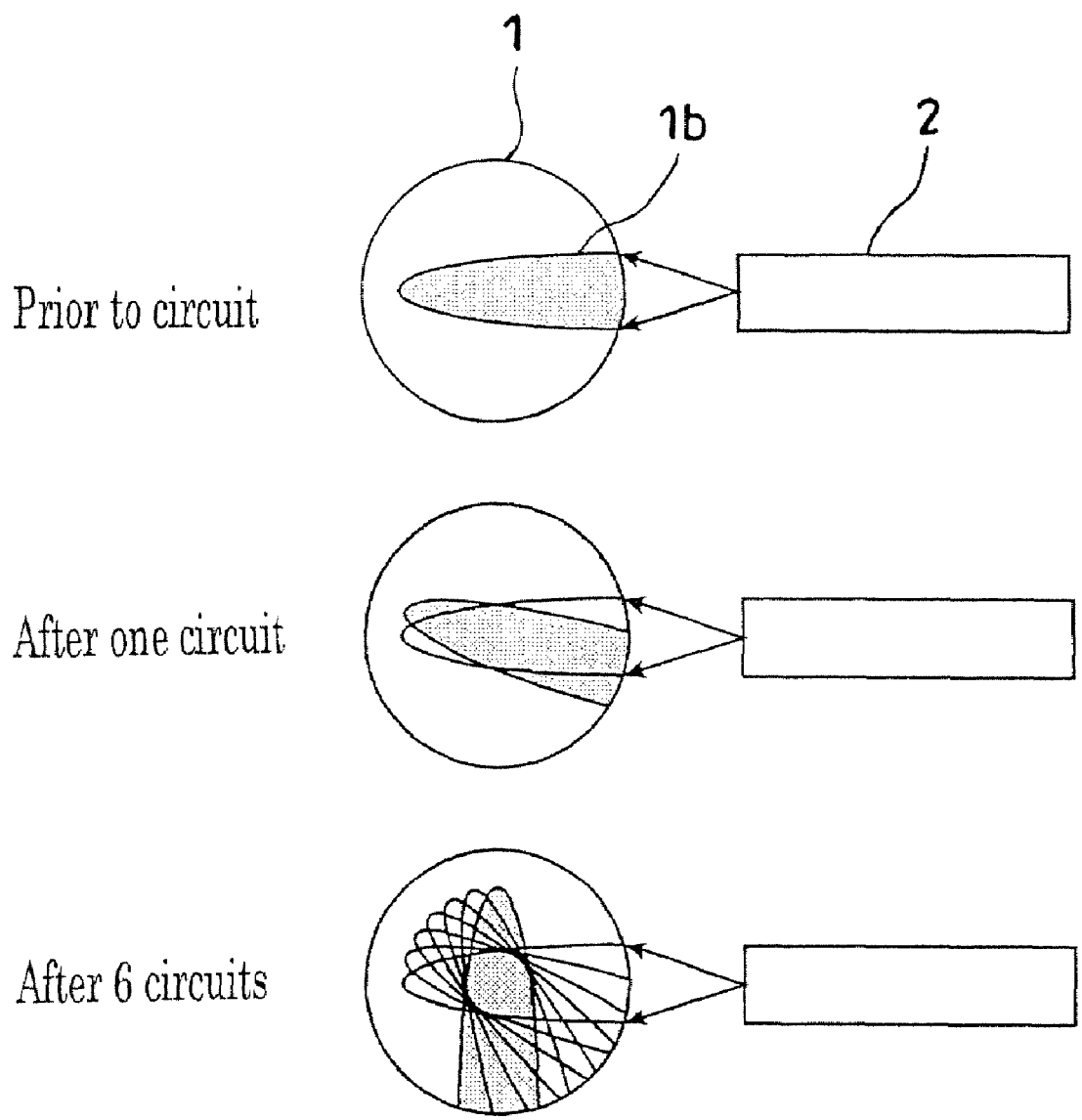
FIG. 32 shows the strongly excited region in the laser medium through which the laser beam passes and is thereby amplified.

Now consider the case of a resonator that incorporates the mode rotating function according to the present invention. The laser beam traveling along the optical path of the resonator is to be amplified through the laser medium as shown in FIG. 32 which has a strong non-uniform distribution of excitation. Each time the light passes through this excited region, a different part of the laser beam is amplified, and this is repeated, producing an amplification of the beam that is equivalent to the beam being uniformly amplified across its whole cross-section.

Even if a solid-state laser rod is excited from one side by an irradiation of exciting light, for example, from the viewpoint of the laser beam, it is the same as if the exciting light are distributed over the entire side of the laser rod. In this case the optical non-uniformity of the laser medium and optical elements is averaged out by the effect of the transverse mode rotation and has much less of an affect on the laser beam than is the case with a Fabry-Perot resonator. This is because the light within this resonator has a high non-locality that means it is impossible for any light at an instance in the beam cross-section to be identified spatially along the time progression.

EXAMPLE 2

Figure 4:
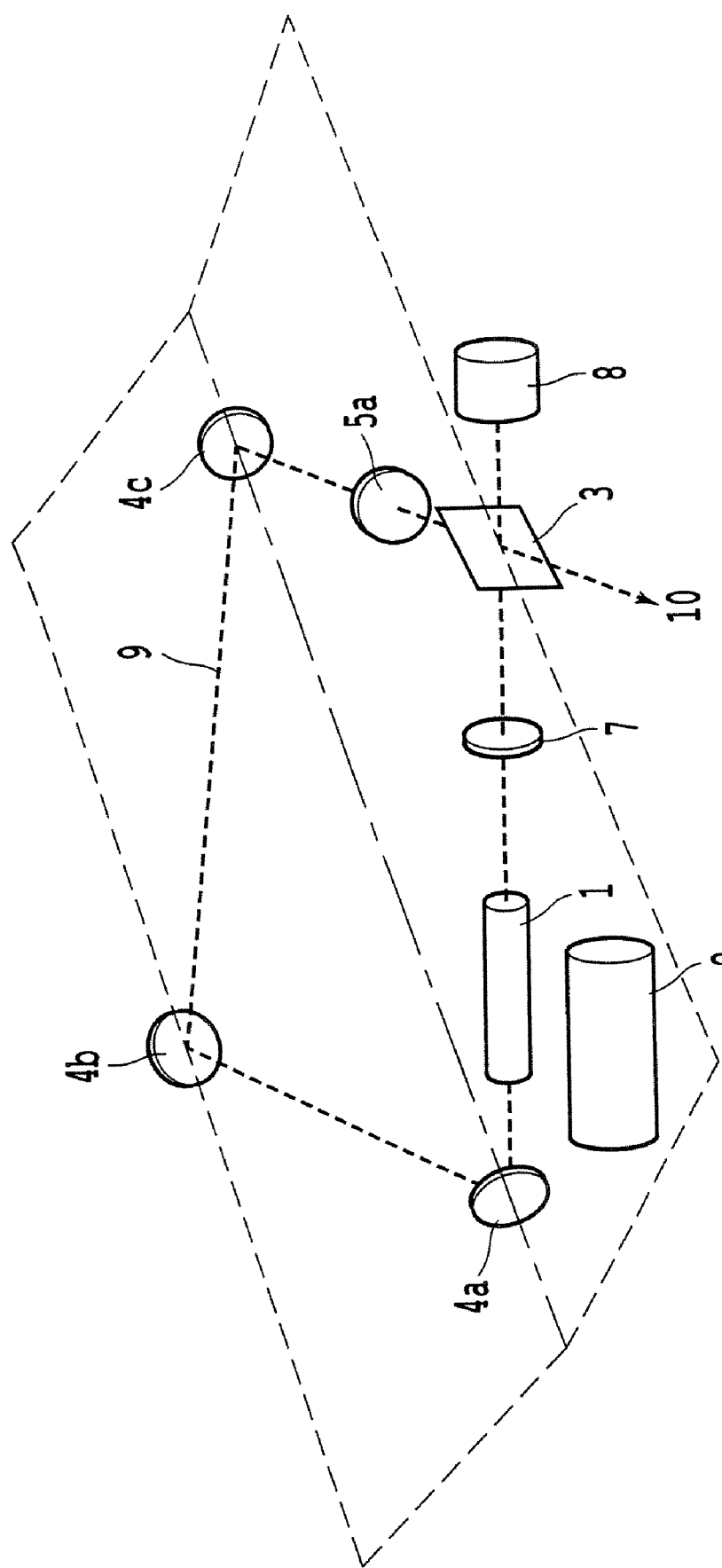
FIG. 4 shows a nonplanar ring resonator that is a second embodiment of the invention.

FIG. 4 shows an example of the basic configuration of a nonplanar ring resonator comprising a plurality of reflection points not in a single plane. In this example, the ring resonator is constituted by three reflecting mirrors 4a, 4b and 4c and a polarizer 3. The laser oscillator is comprised of this resonator and a laser medium 1, half-wave plate 5a, lens 7 and a laser excitation apparatus 2 located on the optical path of the resonator. The lens can be removed and one or more of the mirrors replaced by concave mirrors.

Figure 5:
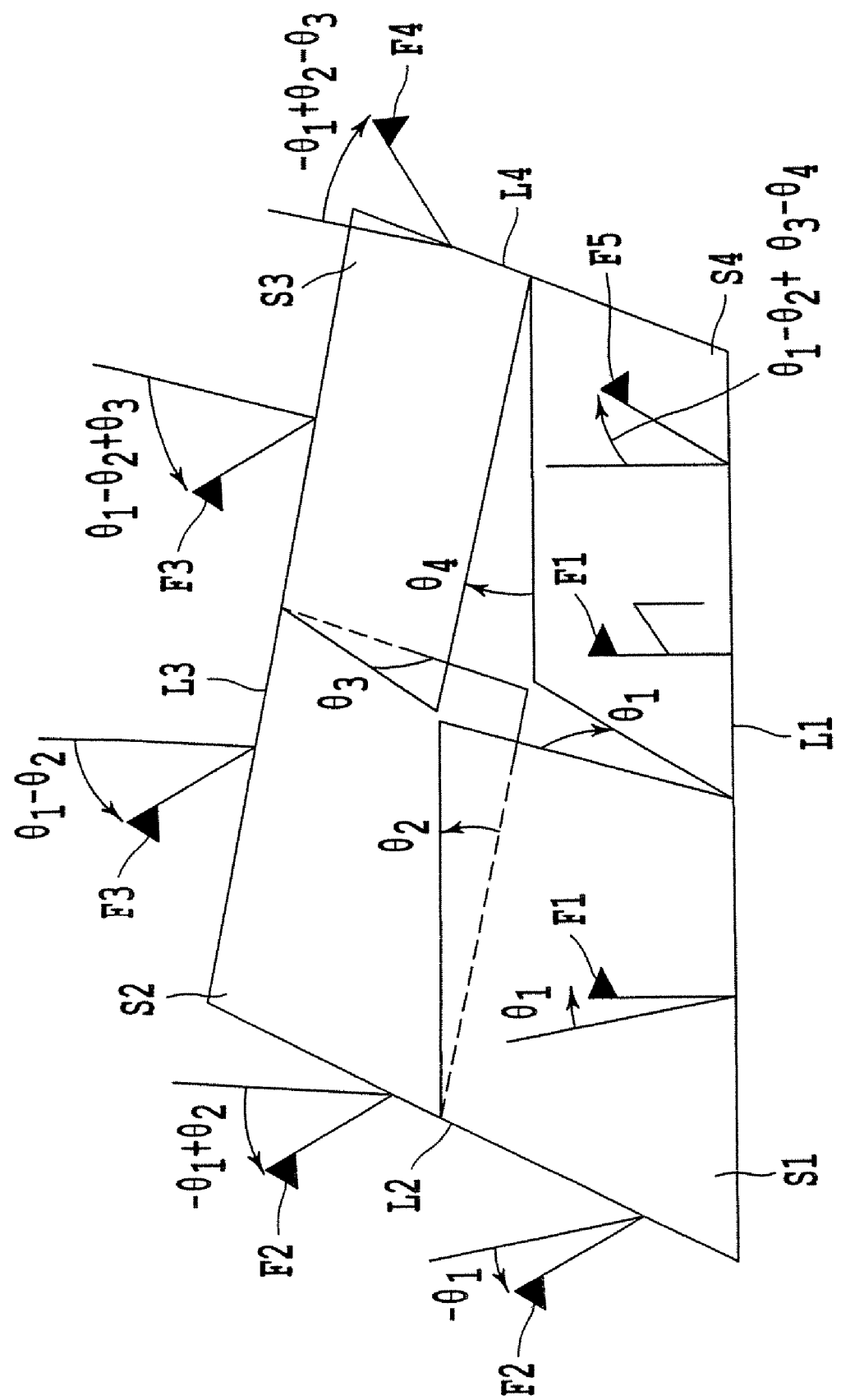
FIG. 5 shows the optical image rotation per a circuit.

The transverse mode rotation of one circuit of the optical path in this resonator will now be described with reference to FIG. 5. As stated, there are four reflection points on the optical path, with the reflection point on the reflecting mirror 4b being higher than a plane formed by the other reflection points. The light is assumed to be traveling clockwise around the resonator, with respect to the drawing sheet. Here, in measuring the transverse mode rotation angle and angles formed between planes, the counterclockwise direction is regarded as positive looking the direction in which the light comes (opposite to the direction of travel). Each of the reflection points has an incident optical path and an exit optical path. The planes of incidence defined by these two paths are $S_1$, $S_2$, $S_3$ and $S_4$. Viewed from $S_1$, the tilting angle of $S_4$ is $\theta_1$, and viewed from $S_2$, the tilting angle of $S_1$ is $\theta_2$. In the same way, $S_3$ as viewed from $S_2$ can be defined as $\theta_3$ and $S_3$ as viewed from $S_4$ can be defined as $\theta_4$. In this case shown in the drawing, $\theta_1$ and $\theta_3$ each have a positive value and $\theta_2$ and $\Theta_4$ each have a negative value.

At first, on optical path $L_1$, there is assumed to be an arrow image $F_1$ that stands perpendicular to the plane of incidence $S_4$ and its electric field vector parallel to the arrow. Viewed from above $S_1$, arrow $F_1$ is inclined $\theta_1$ degrees from the $S_1$ vertical. The reflected arrow $F_2$, which is reversed, is inclined $-\theta_1$ degrees from the $S_1$ perpendicular, as viewed on $S_1$. Viewed from above $S_2$, arrow $F_2$ is inclined $-\theta_1+\theta_2$ degrees. So after reflected once around the resonator arrow $F_5$ have a rotation angle of $\theta_R=\theta_1-\theta_2+\theta_3-\theta_4$. Since $\theta_R=\theta_1+\theta_2+\theta_3+\theta_4=0$, $\theta_R=2(\theta_1+\theta_3)$. From the sign of these angles it can be recognized that this optical configuration shown in FIG. 5 produces effective image rotation even if the non-planar is small.

Next, it is assumed that the arrow $F_1$ is inclined $\phi_0$ degrees from the perpendicular of the plane of incidence $S_4$. After one circuit of the resonator, the image inclination $\phi_1$ will be $\phi_1=\phi_0+\theta_1-\theta_2+\theta_3-\theta_4$. After the next circuit, substituting $\phi_2$ and $\phi_1$ for $\phi_1$ and $\phi_0$, $\phi_2$ will be $\phi_2=\phi_0+2(\theta_1-\theta_2+\theta_3-\theta_4)$. Thus, as the number of circuits increases, it gives rise to a sustained image rotation.

However, when the resonator is formed from an odd number of reflecting surfaces, the rotation is different. If five reflecting surfaces are used, for example, the image rotation angle the first time around the resonator will be $\phi_1=-\phi_0-\theta_1+\theta_2-\theta_3+\theta_4-\theta_5$. Following the next circuit in the same manner as described above, $\phi_2$ will be equal to $\phi_0$, and the image rotation is no longer sustained. The image after each circuit in this resonator is a rotated mirror image that is the rotation of the horizontally or vertically reversed original image whereas in the even reflection resonator the image is always a rotated erect image.

However, even if sustainable rotation is not achieved, it is still able to select the fundamental TEM mode as in the case of sustainable rotation because the TEM mode selection is determined by the rotation of the transverse mode pattern in each circuit or round-trip.

In contrast, in the case of sustainable rotation by the resonator composed of an even number of reflecting surfaces, the transverse mode pattern continues to be rotated around the optical axis as the light travels around the resonator. As a result, there is a high equalization effect that averages out any spatial non-uniformity of the optical characteristics of the optical parts in the resonator. The combined effect of this equalization and mode selection makes a laser beam to be in a uniform intensity distribution regardless the excitation distribution of the laser rod is not uniform.

In this case, moreover, since the electric field vector as well as the transverse mode pattern rotates as the laser beam travels around the resonator, the polarization direction rotates too. The polarizer 3 in FIG. 4 is disposed to maintain the original vertical polarization component in the resonator and this light is amplified by the successive passage through the laser medium to start and sustain the laser oscillation. The horizontal polarization component passed through the polarizer 3 is utilized as a laser output. The half-wave plate 5a is used to control the amount of output coupling, in which case the laser oscillator is said to be a polarization-coupled laser.

Although not shown in the figure the configuration of FIG. 4 can be modified by replacing the polarizer 3 with a reflecting surface and by locating the polarizer 3 at any point on the optical path. The laser beam circulating in the resonator would pass through the polarizer 3, and light reflected by the polarizer 3 would become the output beam. The lens 7 is used to either converge or diverge the laser beam each time it goes around the resonator, and determines the stability-diagram of the resonator. Even without the lens 7, lasing action can still be achieved provided that there is enough gain in the laser medium such as a Q-switched oscillation.

EXAMPLE 3

Figure 6:
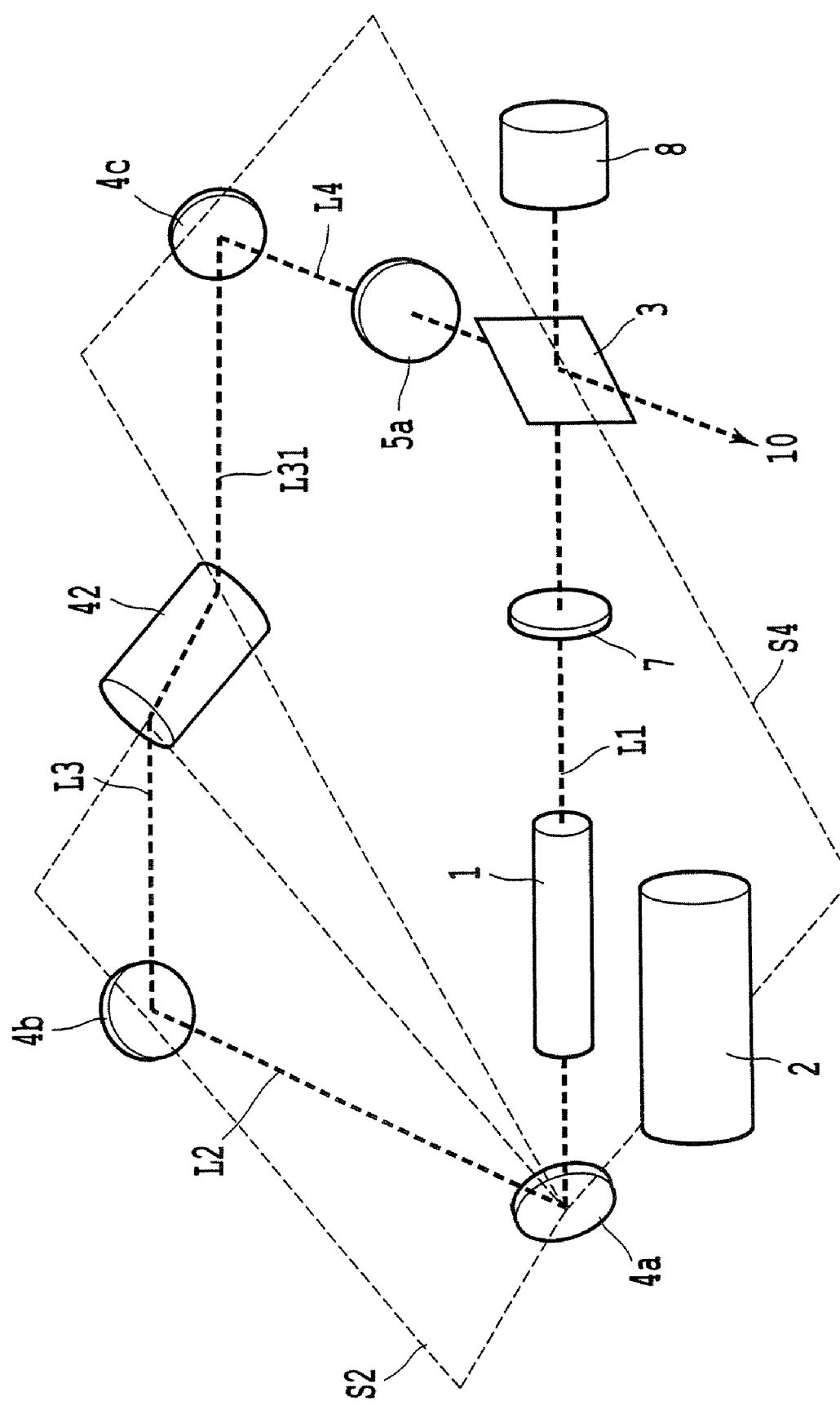
FIG. 6 shows a ring resonator that is a third embodiment of the invention.
Figure 11:
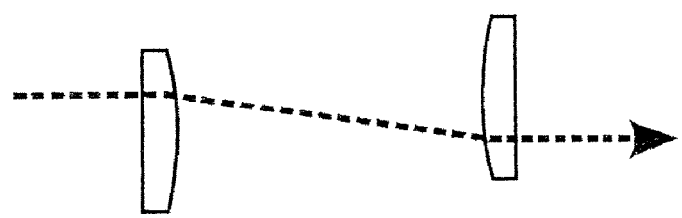
FIG. 11 shows a pair of offset lenses used as a path-shift element.
Figure 12:
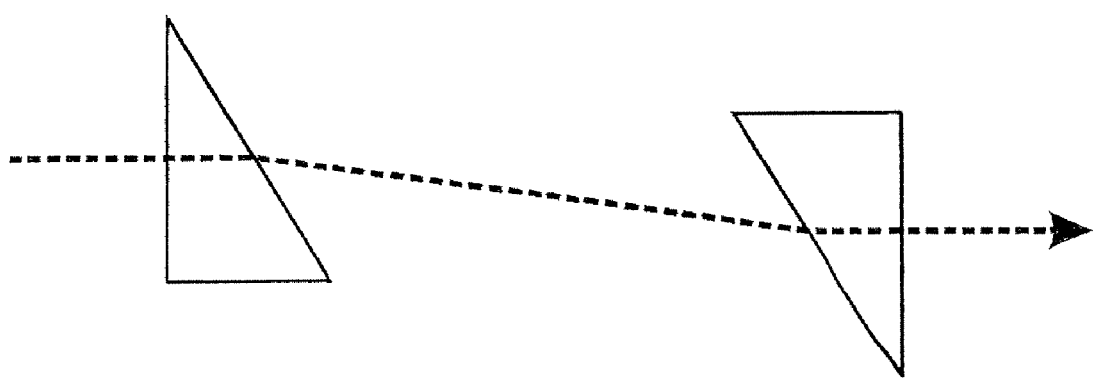
FIG. 12 shows a pair of triangular prisms used as a path-shift element.

A path-shift element 42 can be added to the resonator configuration of FIG. 4 to obtain a more practical, basic configuration shown in FIG. 6. The two optical paths $L_1$ and $L_4$ reflected by the polarizer 3 are on the plane $S_4$, and optical paths $L_2$ and $L_3$ reflected by the reflecting surface 4b are on the plane $S_2$. The two planes intersect at the reflection point of reflecting surface 4a. The path-shift element 42 is located between the optical paths $L_3$ and $L_{31}$ which span the planes. The path-shift element 42 utilizes refraction for parallel translation of the optical paths, and can, for example, be a cylindrical prism such as the one shown in FIG. 8, a Brewster's window such as the one shown in FIG. 9, a double wedge window such the one shown in FIG. 10, a pair of lenses with center-offset optical axes such as in FIG. 11, or a pair of triangular prisms such as in FIG. 12.

There is no reflection on the optical path in the path-shift element 42, so although the optical path is shifted there is no rotation of the transverse mode pattern. Therefore, as long as the optical paths $L_3$ and $L_{31}$ on each side of the path-shift element 42 are parallel with the path $L_1$, a mode pattern that has traveled around the resonator is rotated through an angle that is twice the angle formed between plane $S_4$ and plane $S_2$.

Figure 7:
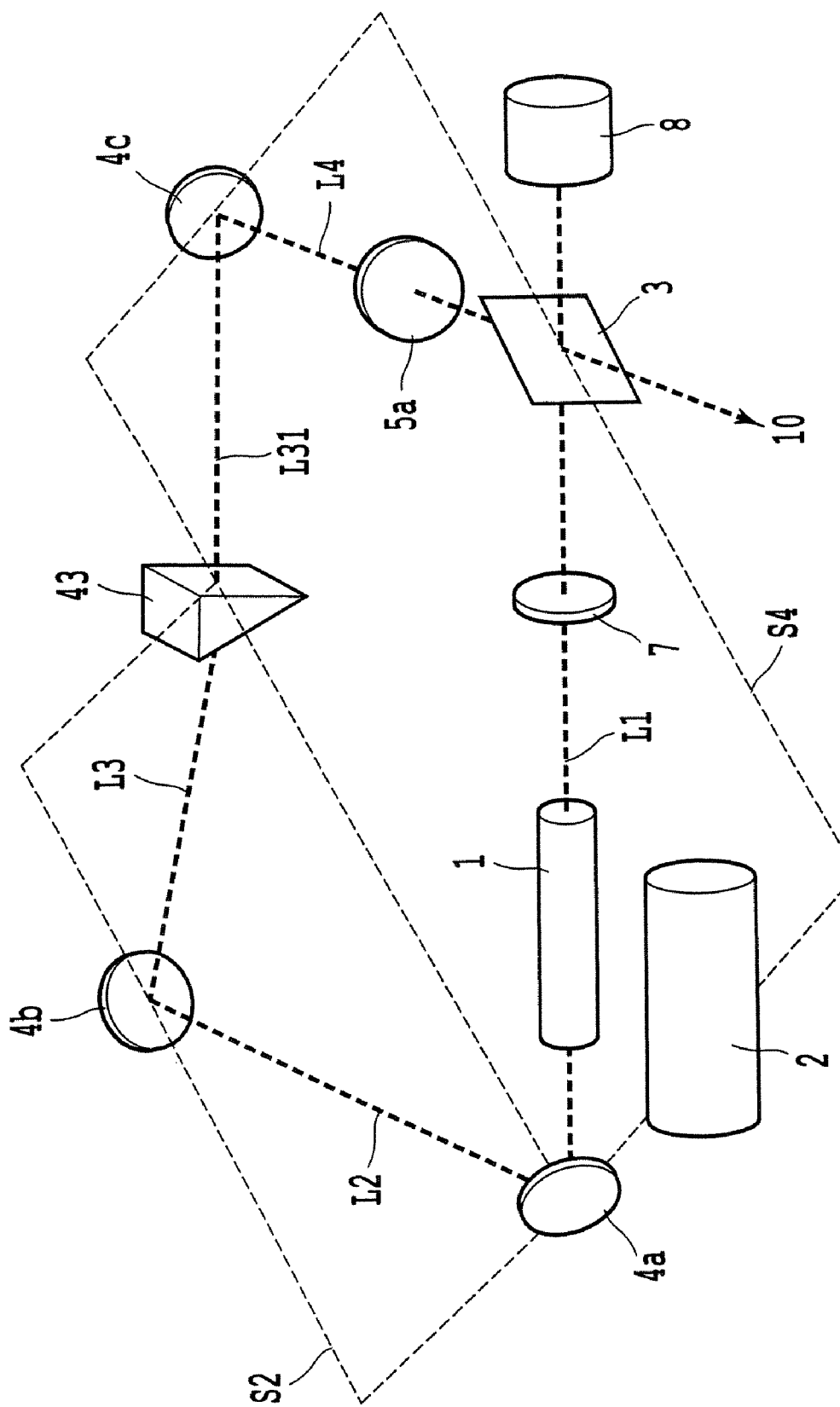
FIG. 7 shows a modified version of the ring resonator of FIG. 6.

Instead of the path-shift element used in the resonator of FIG. 6, a triangular prism 43, as shown in FIG. 7, can be used which uses refraction to bend the optical path. In this case, the refracting surfaces on the optical path may be ignored. As in the above case, the image rotation angle after one circuit of the resonator is the sum of the angles formed between the reflecting surfaces and the planes of incidence, with the symbols changing sequentially.

Across the optical pass in this resonator, inserting a shielding plate with a straight edge to block the laser beam the beam diameter reduces while the round shape of the beam is maintained. In this case too, due to the image rotating mode effect it is equivalent to numerous straight edge shields disposed around the beam cross-section advancing all together towards the center of the beam, thereby shrinking the beam while keeping it round. Thus, it is possible to confine the beam diameter by just using a straight-edge shield instead of an aperture plate.

EXAMPLE 4

Figure 15:
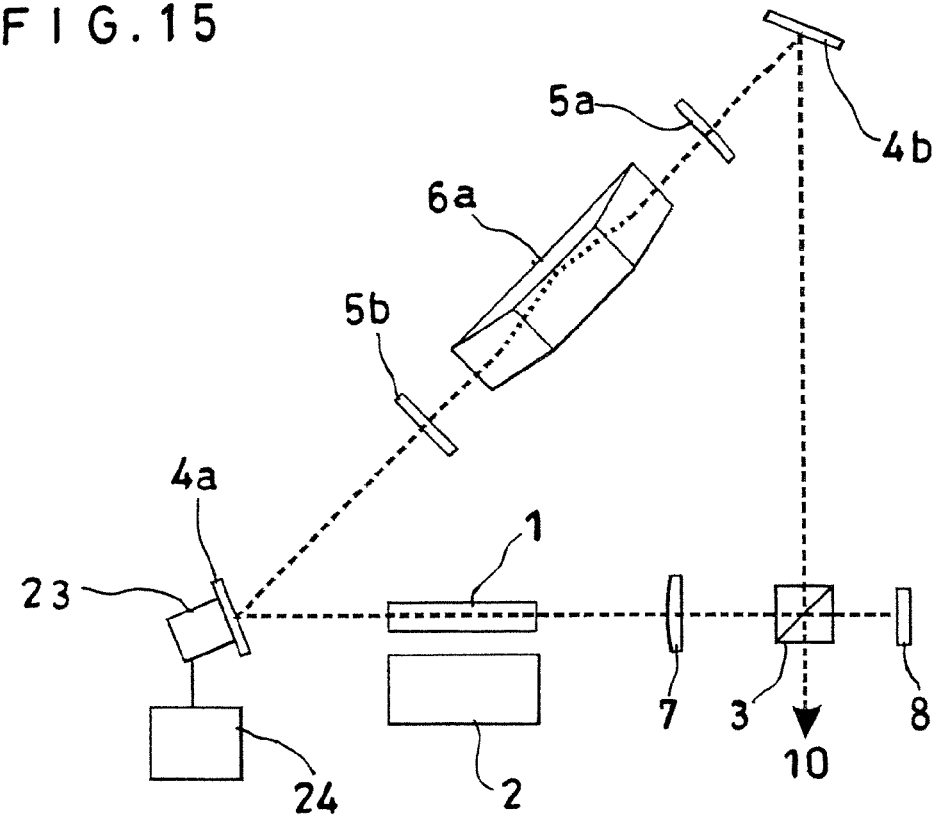
FIG. 15 shows a ring resonator that is a fourth embodiment of the invention.

FIG. 15 shows an example of a laser with a triangular ring resonator composed of polarizer 3 and reflecting mirrors 4a and 4b. Disposed along the optical path are a laser medium 1, a Dove prism 6a sandwiched between the half-wave plates 5a and 5b, and a lens 7. Adding to the resonator, there are a reflecting mirror 8 that returns the counterclockwise laser light output back to the resonator, a laser excitation apparatus 2 that excites the laser medium, and a PZT element 23 affixed to the reflecting mirror 4a to regulate the optical-path length of the resonator that is driven by a driver circuit 24.

Circulation of the light in this resonator will now be explained. First, the light traveling clockwise from the polarizer 3 is linearly polarized perpendicular to the drawing sheet, converged or diverged by the lens 7 and amplified by the laser medium 1. Next, the polarization direction is changed by the half-wave plate 5b so that it is perpendicular to the internal reflecting surface of the Dove prism 6a. When the light passes through the Dove prism 6a, the transverse mode pattern is reversed in a direction perpendicular to the internal reflecting surface of the Dove prism 6a, while the polarization direction is not changed. Next, to optimize the output coupling of the polarizer 3, the half-wave plate 5a is used to set the polarization direction to an angle from the perpendicular to the drawing sheet. Light polarized in the plane of the drawing sheet is output from the polarizer 3. The light reflected by the polarizer 3 is amplified in the next circuit through the resonator to maintain the oscillation. The light is reflected four times in one circuit of the resonator, so the transverse mode pattern of the light is a rotated erect image of the original pattern. This rotation of the light is accumulated on each circuit around the resonator.

If the angle of internal reflecting surface of the Dove prism 6a to the plane of the sheet is small, the rotation of the polarization direction will be small and reflection loss at the incident and exit faces of the Dove prism can be ignored, so the half-wave plate 5b can be omitted. The image rotation by the Dove prism 6a enables the transverse mode pattern rotation while the polarization direction is maintained by the polarizer 3 and the half-wave plate 5a.

Next will be described the counterclockwise circulation of the laser beam in the above resonator adjusted to output the clockwise laser beam in optimum. The half-wave plate 5a is adjusted to obtain the optimal amount of coupling of the beam oscillating in the clockwise direction, so when light that starts off from the polarizer 3 passes through the half-wave plate 5a, the polarization direction thereof is not perpendicular to the internal reflecting surface of the Dove prism 6a. When the light passes through this prism, it is subjected to reflection loss at the incident and exit surfaces. The polarization direction and the mode pattern are reversed with respect to the reflecting surface of the prism. Next, the polarization direction is rotated when the light passes through the half-wave plate 5b. The polarization direction of light that has made one circuit is the same as that of the clockwise light after one circuit, and the output light exits at a rate that is the same as clockwise light output from the polarizer 3. Therefore with respect to the counterclockwise light in this resonator the optical loss is greater by an amount given by the Dove prism than that of the clockwise light. This difference of loss makes unidirectional oscillation possible. Substituting a Faraday rotator for the half-wave plate 5a increases this loss difference more effectively.

In the above laser configuration a half-wave plate and a Dove prism are used as a unidirectional element while a normal unidirectional laser utilizes a half-wave plate and a Faraday rotator. A Faraday rotator needs very strong magnet while the Dove prism is light and small, these make it very easier to construct a unidirectional laser to be small and light weighted, and there is no external leakage of the magnetic field. In a more advanced configuration using the reflector 8 to return the counterclockwise output light back into the resonator, the counterclockwise light is emitted through the polarizer 3 but returned back into the resonator and converted into the clockwise laser light polarized perpendicular to the sheet. As the reflector 8 for this purpose is used that can maintain the polarization, such as a reflecting mirror or a Porro prism with the ridgeline thereof aligned in the direction of polarization or orthogonal thereto. The gain of the unidirectional clockwise oscillation is increased and higher efficiency is obtained from the pumping power to the laser optical power.

Furthermore, it is possible to replace the polarizer 3 by a partial reflecting mirror if the half wave-plate has been rotated back not to emit the laser output from the replacing polarizer 3. In this case, the light polarized parallel or perpendicular to the drawing sheet can circulate in the resonator only with an optical loss at the partial reflector, and their polarization directions are not altered but their transverse mode patterns are rotating. This configuration makes it possible to obtain the laser output of non-polarized or randomly polarized laser light.

EXAMPLE 5

Figure 16:
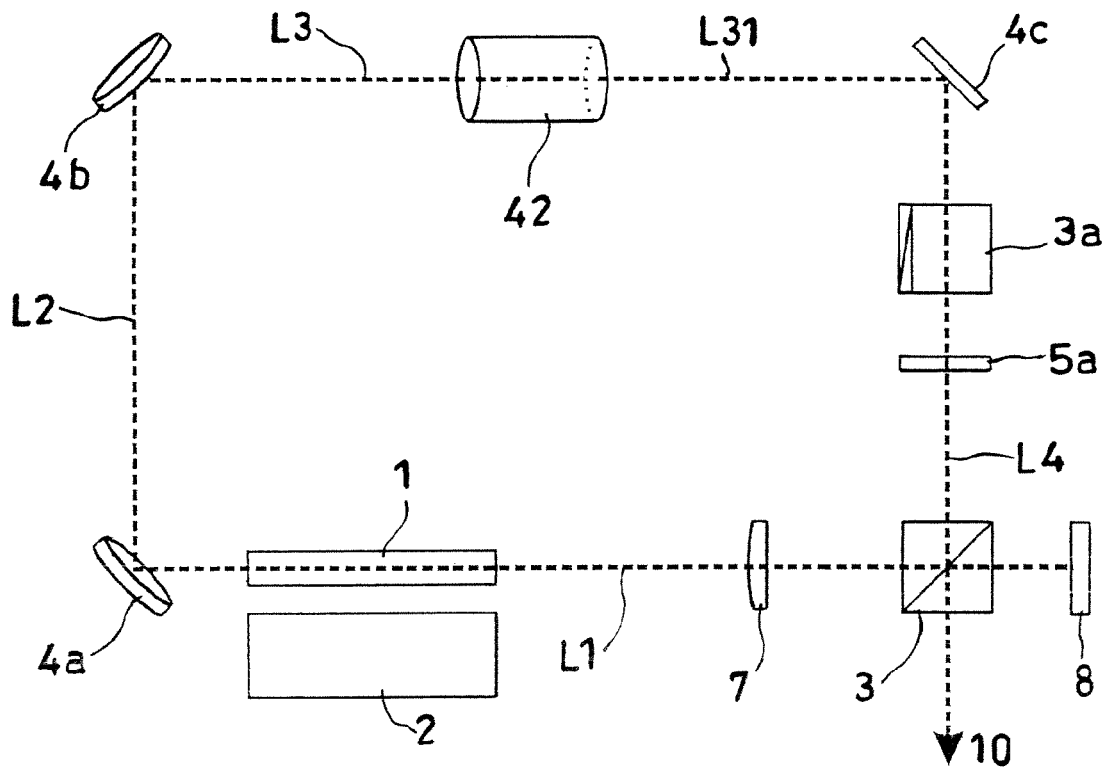
FIG. 16 shows a laser oscillator that is a fifth embodiment of the invention.

FIG. 16 shows an example of a laser oscillator that uses a resonator combining a square ring resonator and a path-shift element 42. The square ring is formed by polarizer 3 and reflecting mirrors 4a, 4b and 4c. The polarizer 3 and the reflecting mirrors 4a and 4c are within a plane of the drawing sheet, and the reflecting mirror 4b is above the plane. Optical path $L_1$ is parallel to optical paths $L_3$ and $L_{31}$, forming a nonplanar ring resonator. Along the optical path there are disposed a laser medium 1, lens 7, a half-wave plate 5a, another polarizer 3a and the path-shift element 42. Outside the resonator, there is a reflecting mirror 8 that returns counterclockwise laser light output from the polarizer 3 back into the resonator, and a laser excitation apparatus 2 excites the laser medium.

The polarizer 3a has the same function as the incident and exit surfaces of the Dove prism in FIG. 15. This polarizer is rotated around the optical path $L_4$ so that it transmits image-rotated clockwise laser light without reflecting any of the light. If sufficient unidirectional oscillation can be effected with the reflector 8, the polarizer 3a may be omitted.

EXAMPLE 6

Figure 17:
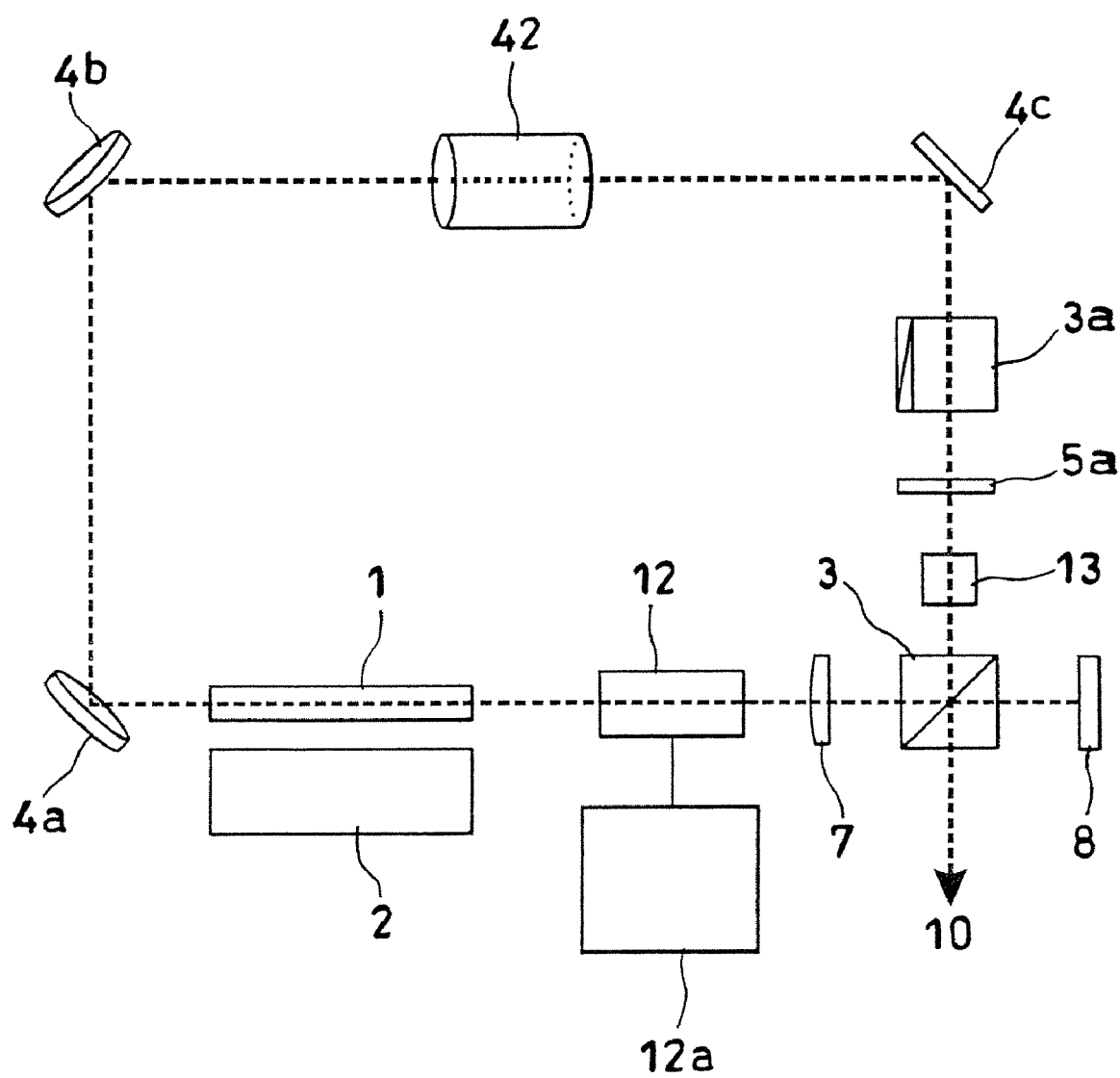
FIG. 17 shows a laser oscillator with a Q-switch that is a sixth embodiment of the invention.

FIG. 17 shows an example of a Q-switched laser, formed by adding a Q-switch 12 to the configuration of FIG. 16, to enable pulsed oscillation. The Q-switch 12 is, for example, an acousto-optic element or a Pockel's cell driven by a driver circuit 12a. If a Pockel's cell is used, to minimize resonator loss, while a polarizing voltage is applied to the Pockel's cell the half-wave plate 5a is rotated so that laser oscillation is initiated under said condition. A nonlinear crystal 13 for generating higher harmonic waves can be provided on the optical path so that the laser pulses generate higher harmonics of the fundamental wave oscillating in the resonator. In cases where it is desired to use continuous-wave laser oscillation to generate higher order waves in the resonator, the Q-switch 12 can be removed.

EXAMPLE 7

Figure 18:
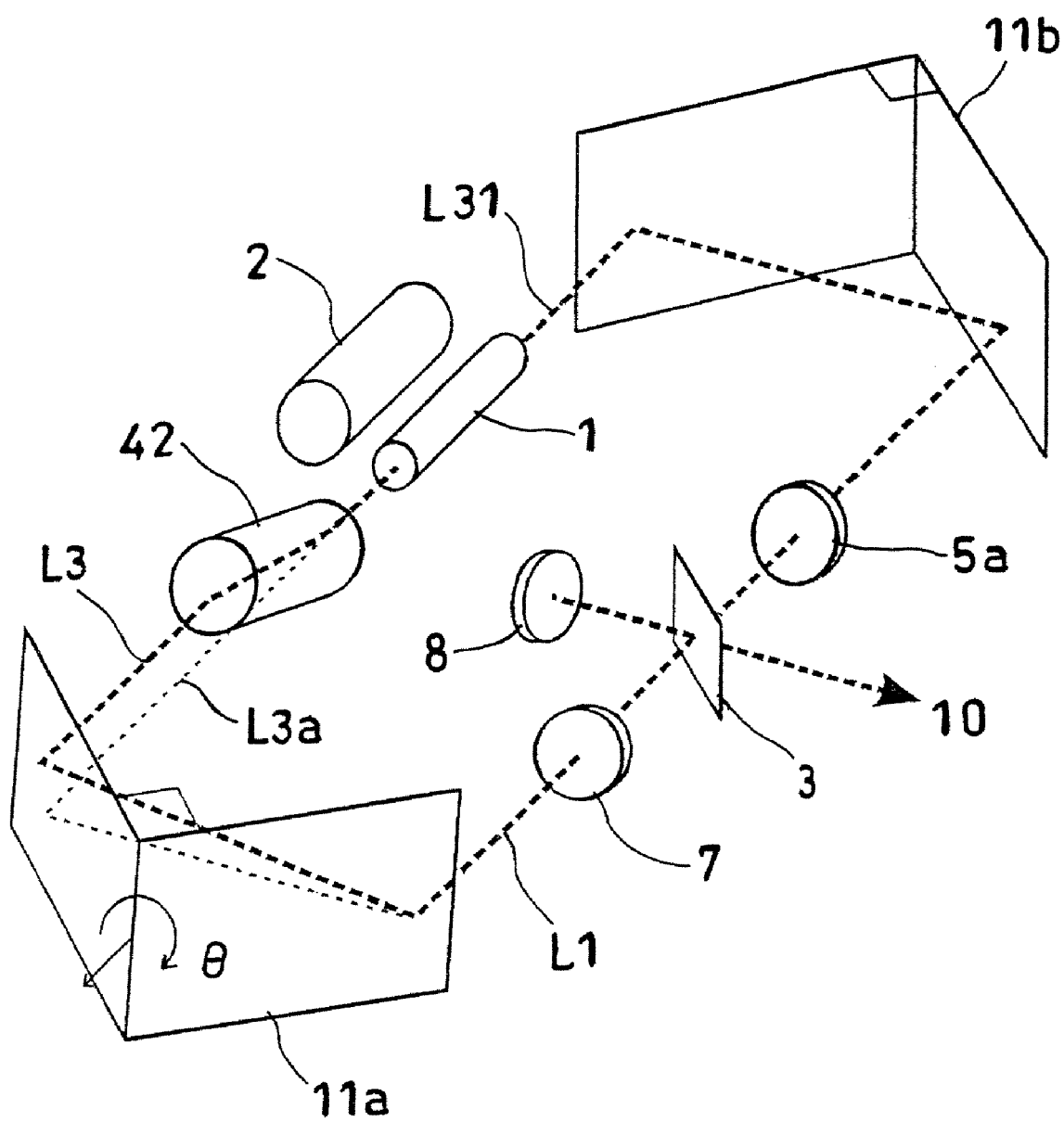
FIG. 18 shows a laser oscillator using a ring resonator with a pair of opposite retro-reflectors.

The laser apparatus shown in FIG. 18 is a laser oscillator that uses a ring resonator having a pair of opposed retroreflectors 11a and 11b each consisting of two reflecting surfaces joined at right angles. When the ridgelines of the retroreflectors are mutually parallel, the resonator is a planar ring resonator comprised of the optical paths $L_1$, $L_{3a}$ and $L_{31}$. The transverse mode pattern of light that travels around this resonator will not undergo rotation. In this invention, the resonator is configured so that the retroreflector ridgelines are not parallel. Each optical path is orthogonal to its retroreflector ridgeline. Optical paths $L_3$ and $L_{31}$ are parallel, but are connected by the path-shift element 42 because they are offset. With this configuration, the transverse mode pattern of the light is rotated as the light makes a circuit of the resonator. The polarization direction that is rotated together with the transverse mode pattern is returned to the original direction by the half-wave plate 5a, and is further adjusted to achieve the optimal output coupling from the polarizer 3.

The retro-reflector can be comprised of a right-angle prism 31a that bends the light 180 degrees and a half-wave plate 5b, as shown in FIG. 19. The half-wave plate 5b is provided to align the polarization direction of the incident light with the prism ridgeline. If there was no half-wave plate 5b, two Fresnel's reflections in the prism will produce a phase difference between the polarization components in the ridgeline direction (S polarized light) and the polarization component orthogonal thereto (P polarized light). As a result, linearly polarized light incident on the right-angle prism will exit generally as elliptically polarized light. The half-wave plate 5b prevents the elliptical polarization of the exit light by allowing only S polarized light (or P polarized light) to enter the prism.

Figure 20:
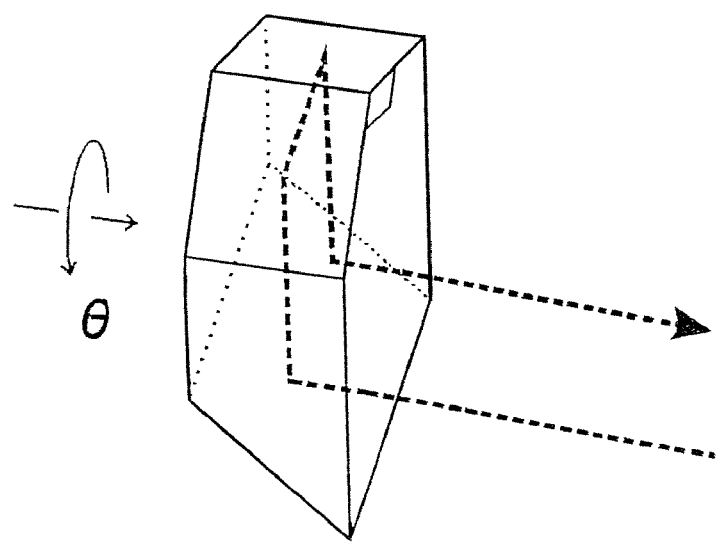
FIG. 20 shows a polarization maintaining prism used as a retro-reflector.

The polarization maintaining prism shown in FIG. 20 can be used in place of the right-angle prism 31a and half-wave plate 5b. This prism has the shape of two right-angle prisms bonded together. Light entering to the first reflecting surface at an incidence angle of 45 degrees is totally reflected four times before exiting. The S, or P, components of incident light is reflected as S, P, P and S, or P, S, S and P, so no phase difference will occur between the exited two components. When the prism is rotated, linearly polarized incident light exits as linearly polarized light in which the image and polarization have been rotated.

EXAMPLE 8

Figure 21:
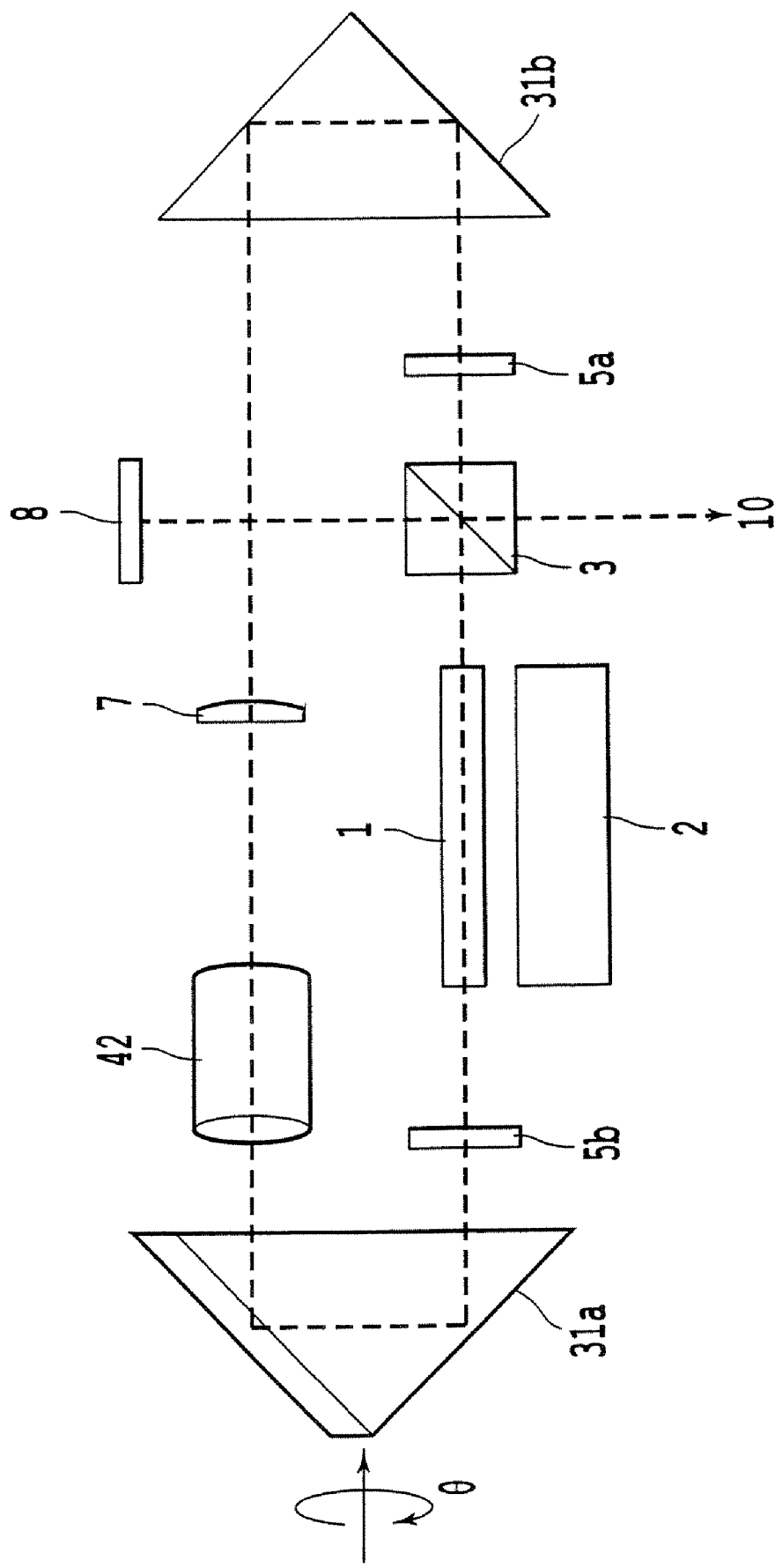
FIG. 21 shows a pair of right-angle prisms constituting retro-reflectors that is an eighth embodiment of the invention.

FIG. 21 shows this configuration as a ring resonator that uses right-angle prisms as the retroreflectors. In this case, the half-wave plate 5b may be omitted if the ridge-line angle between the prisms 31a and 31b is small.

EXAMPLE 9

Figure 22:
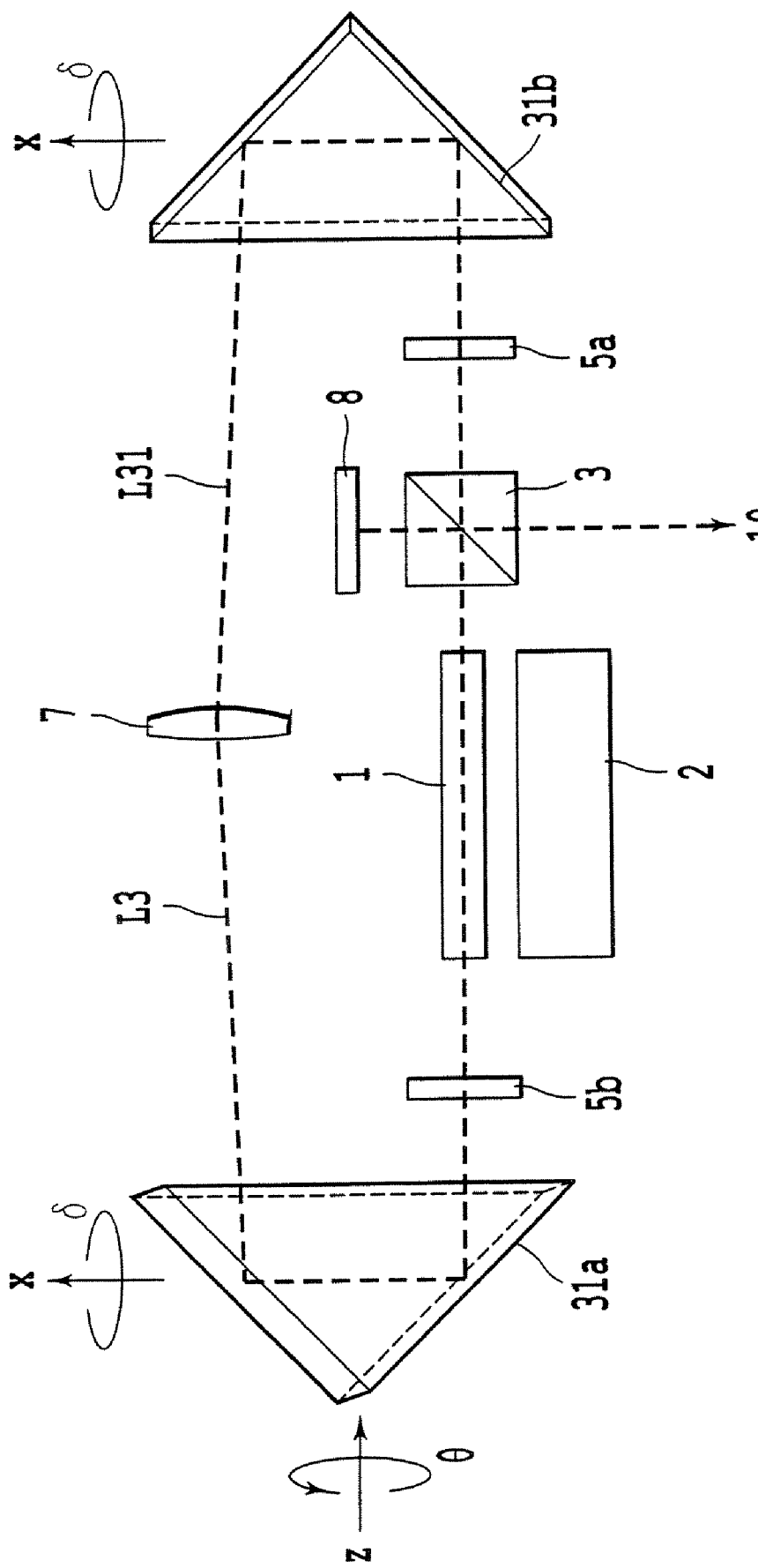
FIG. 22 shows a pair of rotated right-angle prisms that is a ninth embodiment of the invention.

If the path-shift element 42 is omitted in the above configuration, as shown in FIG. 22, and instead right-angle prisms 31a and 31b are disposed and rotated around the x axis, the optical paths $L_3$ and $L_{31}$ can be made to intersect at the position of the lens 7. The paths $L_3$ and $L_{31}$ are not parallel, and can be joined by passing the light through an off-center point of the lens 7. This resonator is still a nonplanar ring resonator.

EXAMPLE 10

Figure 23:
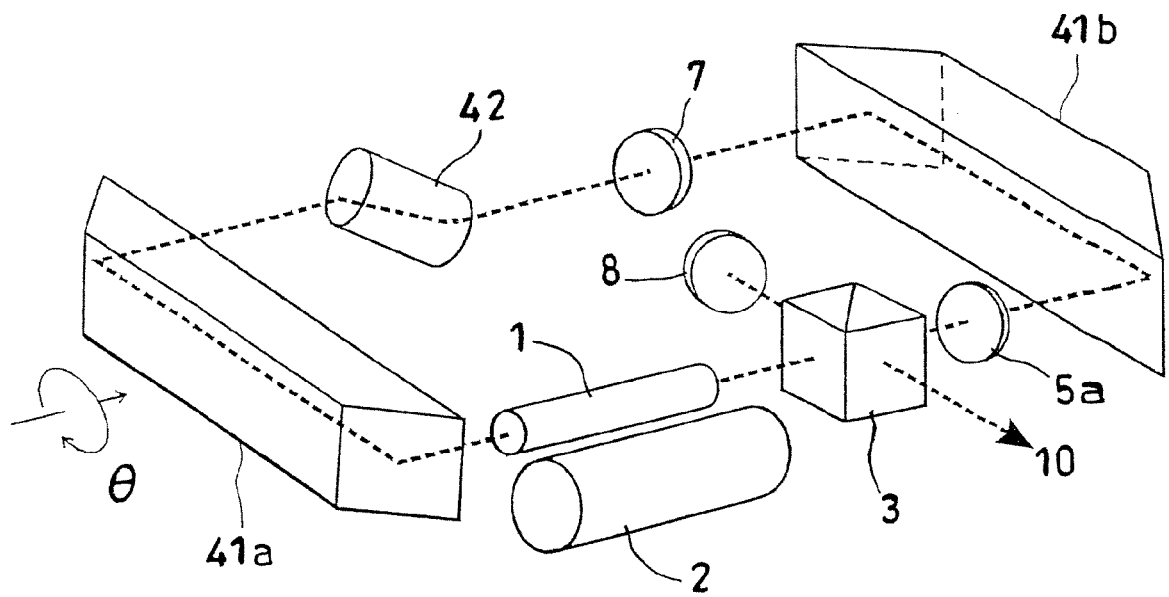
FIG. 23 shows a pair of trapezoidal prisms that is a tenth embodiment of the invention.
Figure 24:
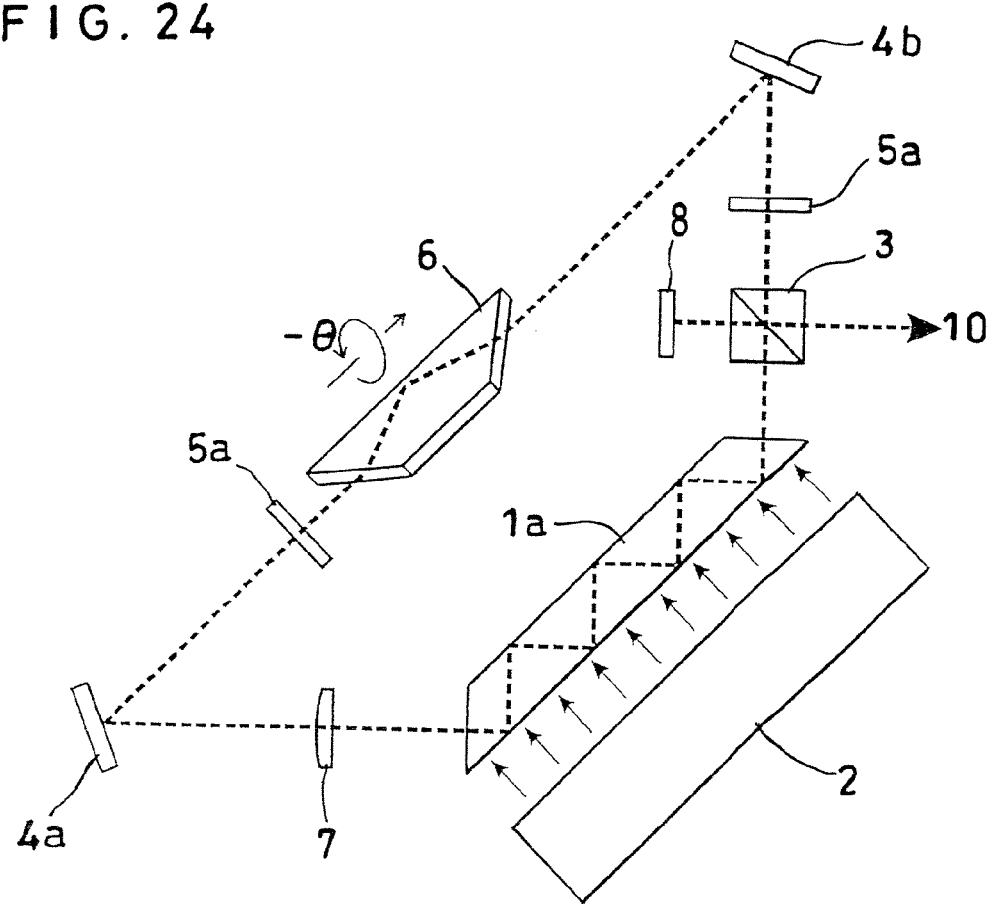
FIG. 24 shows a ring resonator using a solid-state laser rod instead of trapezoidal prisms that is a modification of the embodiment of FIG. 10.
Figure 25:
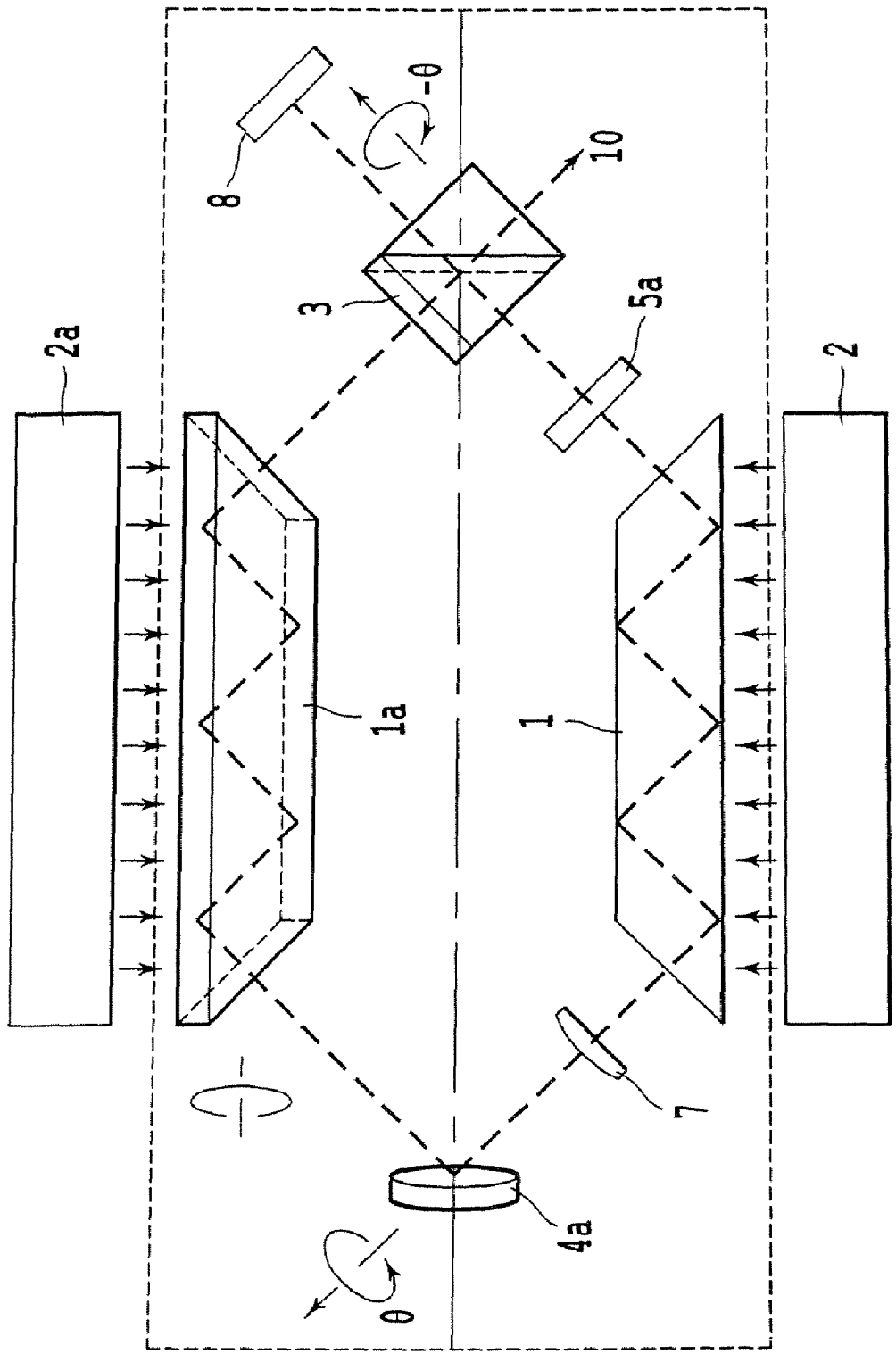
FIG. 25 shows a ring resonator using a pair of laser media instead of trapezoidal prisms that is a modification of the embodiment of FIG. 10.

A nonplanar ring resonator, such as the one shown in FIG. 23, can be constituted using trapezoidal prisms obtained by cutting out just the internal optical path region of right-angle prisms. Also, a transverse mode rotation type ring resonator can be constituted, as shown in FIG. 24, by substituting a solid-state laser rod 1a for the trapezoidal prisms. Also, a resonator such as the one shown in FIG. 25 can be constituted using two such laser media. The optical path passing through laser rod 1 is in a plane of the drawing sheet, but the optical path through the laser rods 1a is passing above the plane. The plane that includes the latter optical path intersects the plane of the drawing sheet along a line connecting the reflecting mirror 4a and the polarizer 3.

EXAMPLE 11

Figure 26:
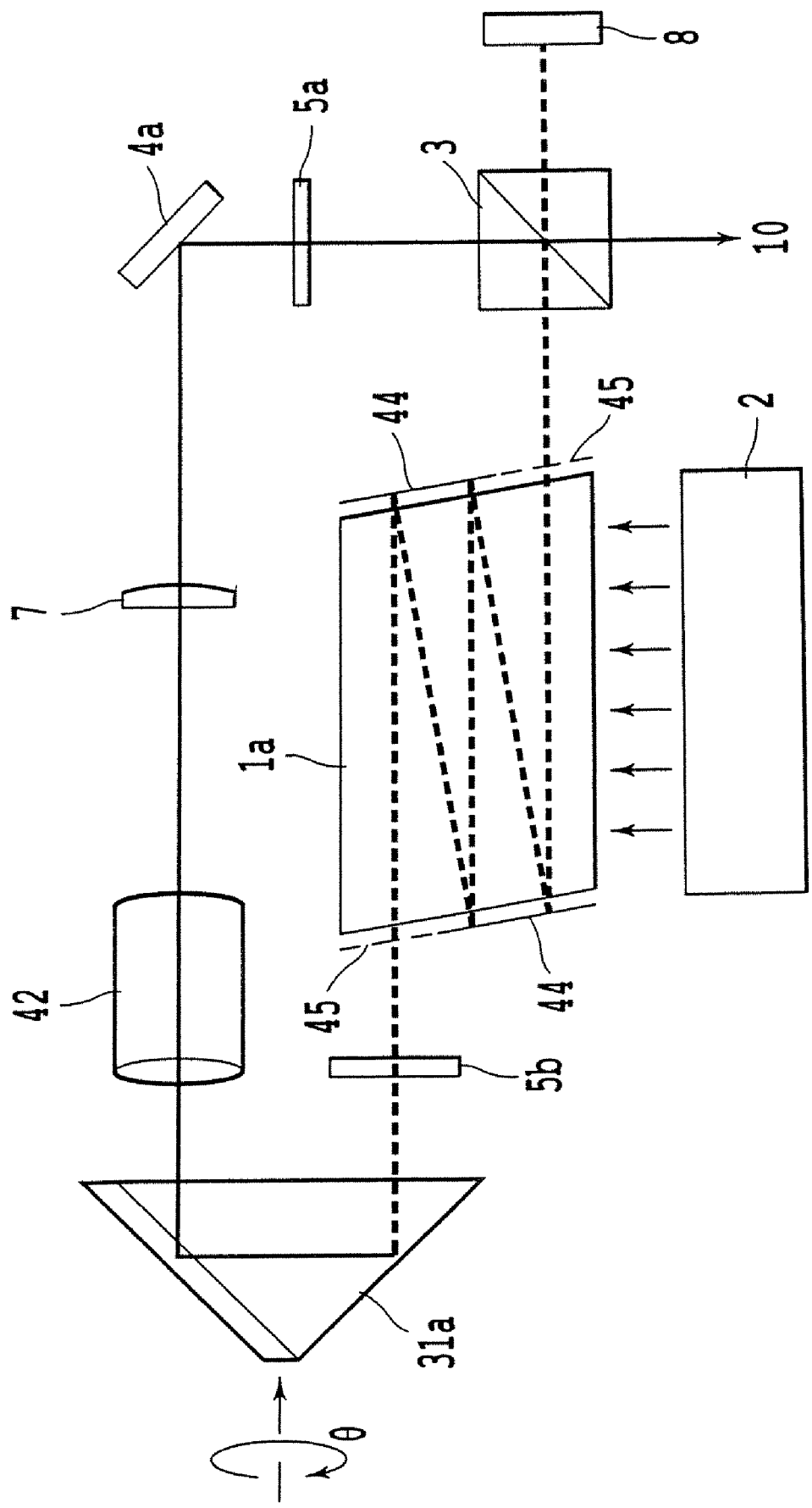
FIG. 26 shows an image rotating type resonator using right-angle prisms, an optical path-shift element and a solid-state laser rod that is an eleventh embodiment of the invention.

FIG. 26 shows an image rotating type resonator using an image-rotating right-angle prism 31a, a path-shift element 42 and a multi-path solid-state laser rod 1a. The incident and exit faces of the laser rod 1a are each provided with an anti-reflection coating 45, and other area in these surfaces are coated with high-reflection films 44.

EXAMPLE 12

Figure 27:
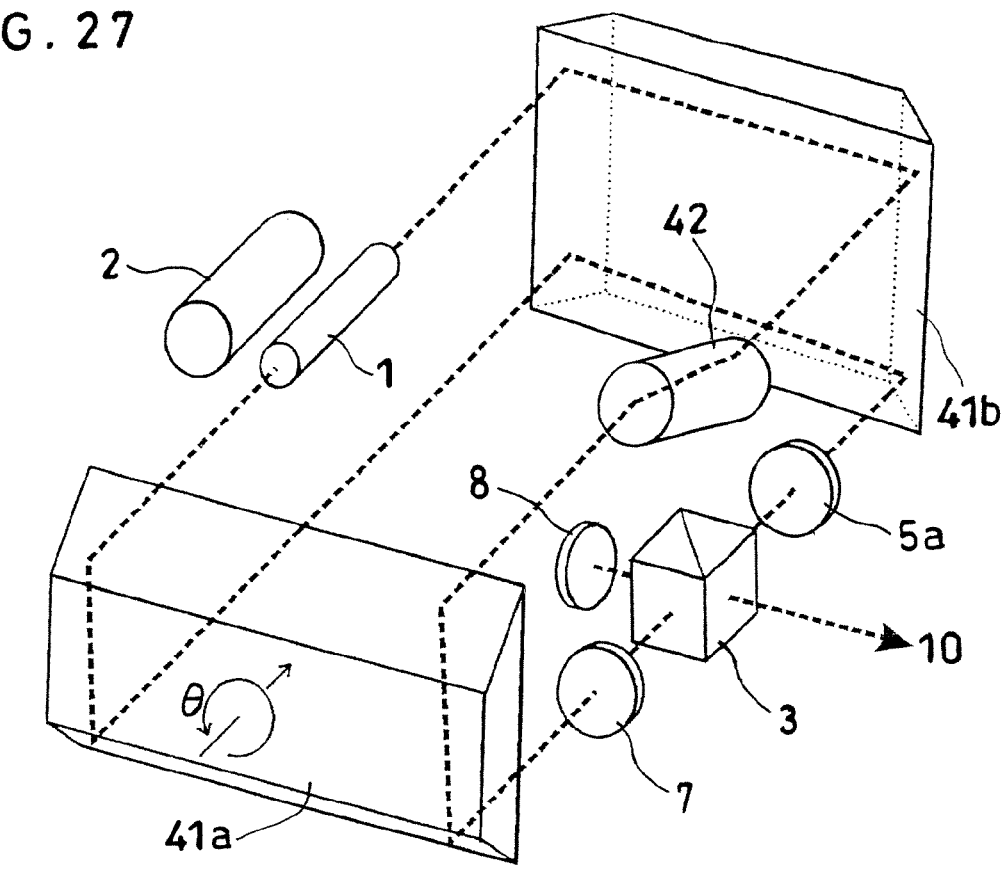
FIG. 27 shows a ring resonator using a pair of trapezoidal prisms that is a twelfth embodiment of the invention.

FIG. 27 shows an auto-compensation type ring resonator using a pair of trapezoidal prisms. The trapezoidal prisms 31a and 31b are a part of right-angle prisms cut out only the portion of light paths running. The trapezoidal prism 31a is rotated so that the ridgelines of the two prisms that are possessed before the cutting are not orthogonal. Therefore, when the light travels once around the resonator, the transverse mode pattern rotates. In the case of a right-angle prism, the path-shift element 42 is used to connect the optical paths that are offset by the rotation of the prism. The feature of this auto-compensation resonator is that a new optical path is always built up whether the optical alignment of the two prisms or other optical elements has changed. Another feature of the resonator is that it has a mode pattern rotation function. Reference numeral 20 denotes an output mirror (half-mirror).

EXAMPLE 13

Figure 28:
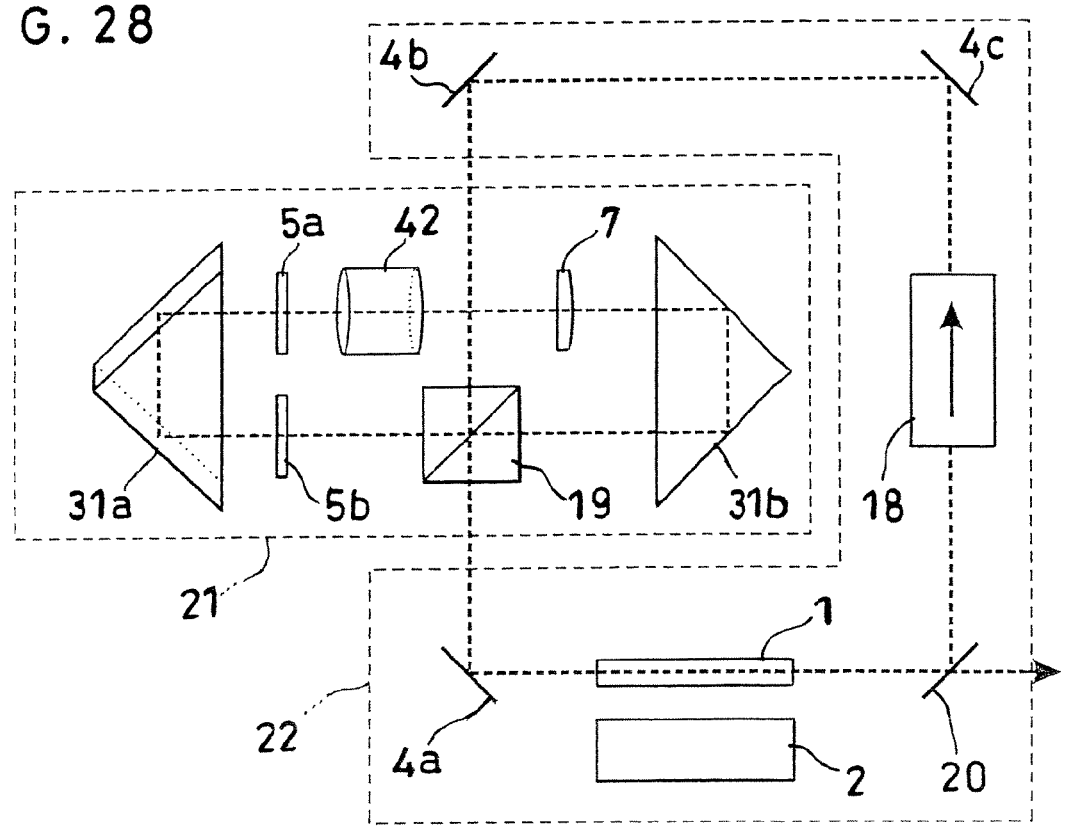
FIG. 28 shows a ring resonator using a crossed right-angle prisms as a thirteenth embodiment of the invention.

FIG. 28 shows a ring resonator 21 that uses crossed right-angle prisms. This is coupled to the resonator of a conventional ring type laser oscillator 22 by a beam-splitter 19. A unidirectional element 18 is used to provide counterclockwise laser oscillation. An image rotating function is incorporated by means of the resonator 21. The laser oscillator 22 may be a Fabry-Perot type resonator laser instead of a ring type resonator.

EXAMPLE 14

Figure 29:
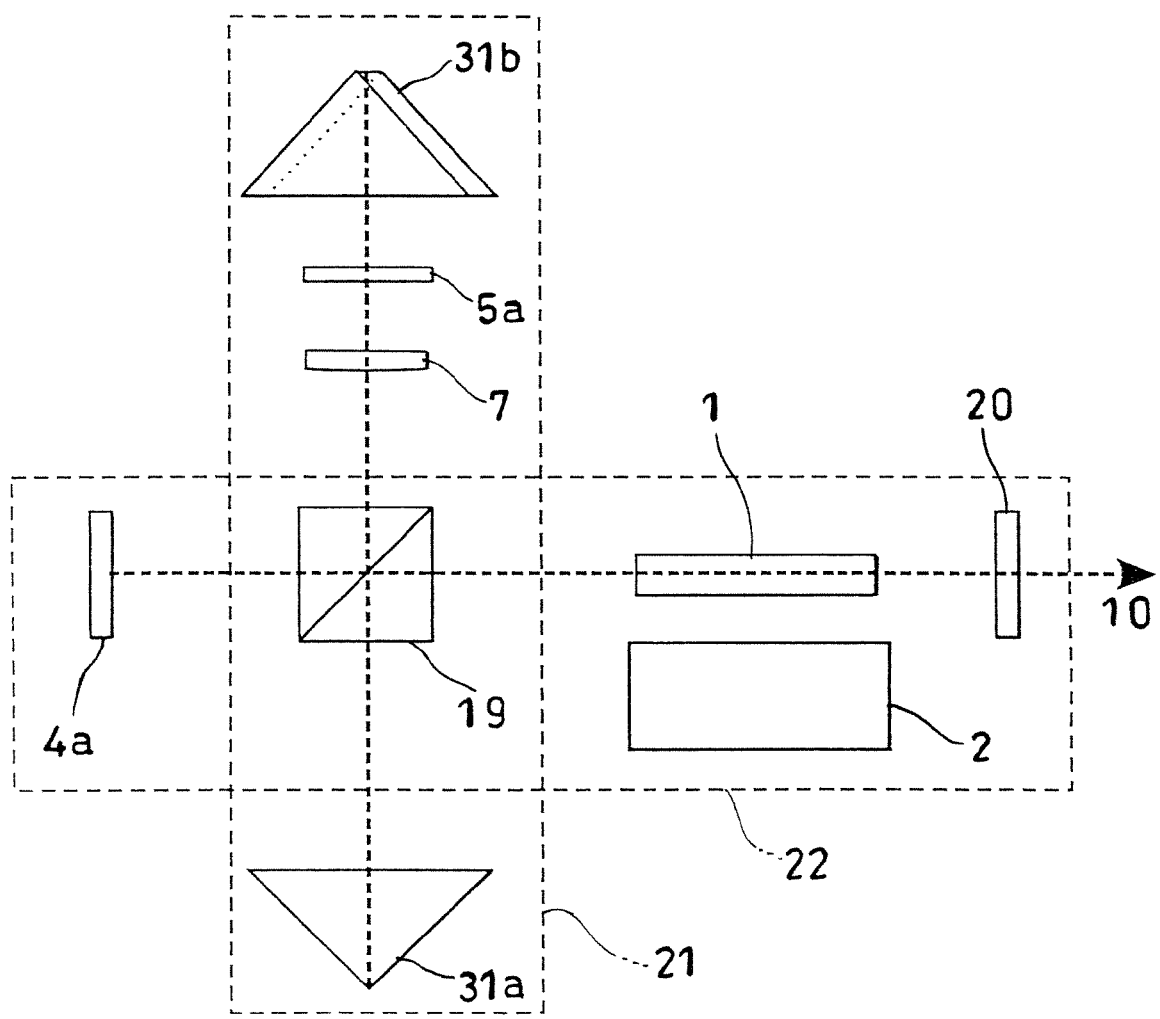
FIG. 29 shows an image rotating type resonator using a crossed right-angle prisms as a fourteenth embodiment of the invention.

FIG. 29 shows a ring resonator 21 that is an image rotating type resonator that uses crossed right-angle prisms. It is coupled to the resonator of a Fabry-Perot resonator type laser oscillator 22 by a beam-splitter 19. An image rotating function is given in the Fabry-Perot resonator by means of this coupling, making it possible to utilize a transverse mode selection effect.

The resonator of the laser oscillator of this invention has a strong mode selection effect and makes it possible to obtain a laser beam having a flat, smooth intensity distribution. It is also possible to readily obtain stable oscillation of the fundamental TEM mode, without using a compensation optical system to compensate for optical non-uniformities of the laser parts.

Moreover, with respect to the laser beam, the effect of any non-uniform laser medium excitation distribution or non-uniform optical element characteristics is averaged over the whole cross-section of the transverse mode. Therefore, even if only the half of the cross-section of the laser rod perpendicular to the rod axis is excited, laser beam is amplified only by the excitation distribution averaged within the beam cross-section. Thus, the transverse mode maintains its top-hat profile, unaffected by any imbalance in the excitation. Therefore, the present invention makes it possible to greatly simplify the excitation apparatus, compared to the prior art in which an optimal excitation distribution is needed to obtain good transverse mode operation.

When a solid-state laser rod is excited from its side, the excitation is strongest at the periphery of the rod. However, the intensity of a fundamental TEM mode is lowest at the periphery, so the energy conversion efficiency at the periphery cannot be heightened. In the present invention, however, the intensity distribution of the laser beam is flat from center to periphery of the mode pattern, making it possible to improve the energy conversion efficiency in continuous and pulsed oscillation mode.

In addition to the good efficiency, top-hat intensity distribution from the present laser resonator is suitable in high-output laser applications. Because the intensity at the beam center is the same at other beam area in this laser optical components are less to be damaged in contrast to the case of a Gaussian beam laser in which the maximum intensity is at the beam center.

Further more, with respect to a misalignment of the optical components in the laser resonator, the image rotating effect makes it possible to maintain a transverse mode to be Gaussian or top-hat profile but just reducing the beam diameter. In contrast to the TEM mode in which this will quickly result in transverse mode degradation, damages to optical components and decreased output, this rotating transverse mode suffers from only a slow decrease of output power, so the stability of the laser is greatly improved. This is because the difference of the requirements in the optical alignment of the laser cavities. In TEM mode the laser mirrors have to be aligned to hold the resonance condition of the light wave-fronts. In the present resonator, on the contrary, it is sufficient to keep the optical axes of the optical components in the precision of geometrical optics through which the transverse mode patterns are circulating.

The laser oscillator of this invention can also be used for pulsed oscillation using a Q-switch or mode locker as in a conventional laser oscillator, and the output wavelength of the laser can be shortened using wavelength conversion elements such as nonlinear optical crystals in the resonator.

If the lens 7 provided on the optical path of the resonator is a convex lens and its focal length becomes shorter than the length of the resonator the beam divergence angle of the output laser beam becomes large. In such a case, there will appear a sharp peak at the center of the output beam mode pattern whose intensity is very higher than that of surrounding flat intensity area. This is due to the difference of the Q values of resonance between the center and the peripheral. Here the length of the resonator ring will be denoted by L, the speed of light by c, and the image rotation angle per circuit of the resonator by $\theta$. With respect to the beam center the light travels around the resonator back to the original point and this resonant spectrum has a usual frequency interval of c/L. The peripheral light returns to the original point after traveling $2\pi/\theta$ times around the resonator. Therefore, the frequency interval between the resonances will be $c\theta/2\pi L$, so clearly the resonant spacing of the light at the peripheral part is much smaller than that at the center. If $\theta/2\pi$ is an irrational number, the spectrum becomes continuous. The mode pattern center peak is produced by this difference in resonant spectral structure.

Figure 30:
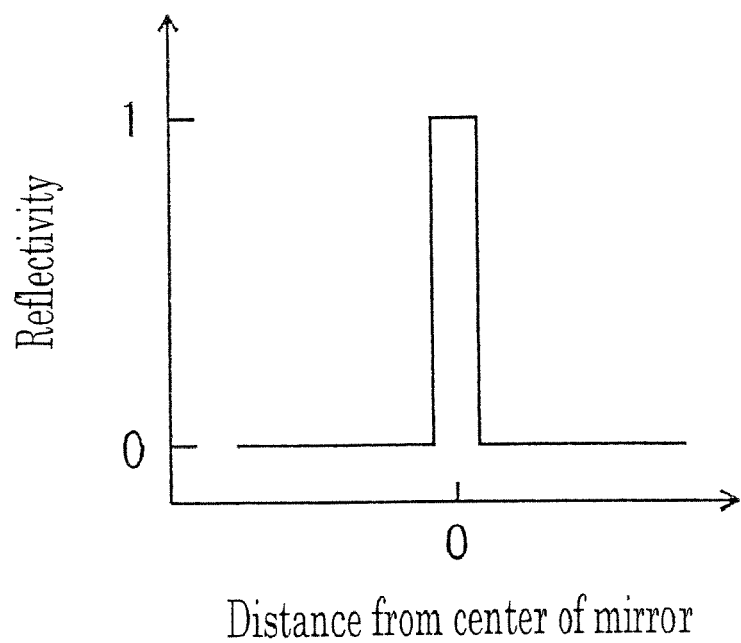
FIG. 30 shows an example of the characteristics of a spatial filter used to prevent damage to the optical element.
Figure 31:
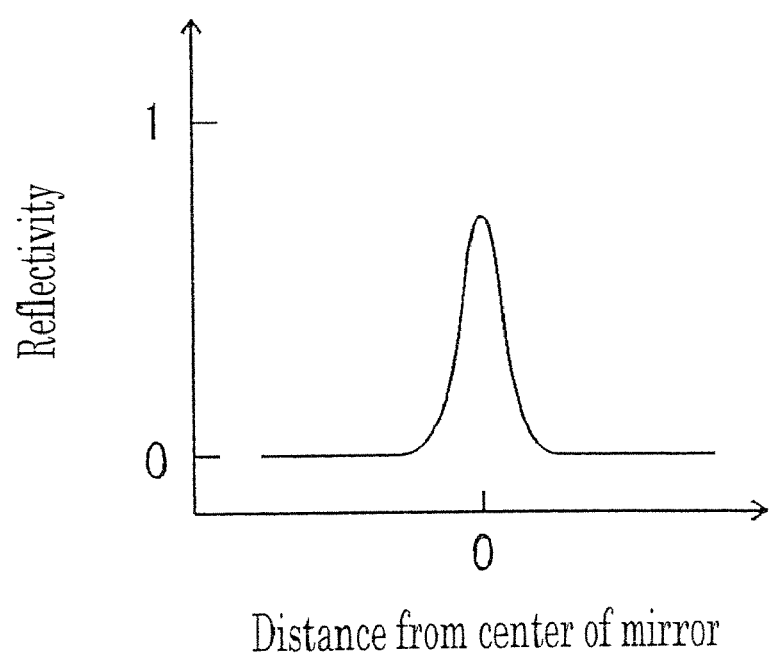
FIG. 31 shows another example of the characteristics of a spatial filter used to prevent damage to the optical element.

Because this peak can easily damage the optical components of the resonator when the laser is in pulsed oscillation, it is necessary to prevent the peak to appear. This can be done by inserting a spatial filter on the optical path, constituted by providing a reflecting mirror having the reflectivity distribution shown in FIG. 30 on the optical path, with the center of the mirror aligned with the optical axis. The mirror used may also be one having a Gaussian reflectivity distribution such as the one shown in FIG. 31. This will reflect away or attenuate the laser beam at the center peak point, thereby preventing the peak to lase.

What is claimed is:

1. A laser oscillator, comprising:
a non-planar optical ring resonator;
an optical amplifier element on an optical path inside the optical resonator, (i) the optical path in the optical resonator having an even number of optical reflections per resonator circuit or round-trip, which is formed by total reflections at each side face of two right-angle prisms and by deflection by a lens through which an off-center position of the optical path passes, (ii) the transverse mode pattern of the laser light in the optical resonator rotating with each resonator circuit or round-trip by a rotation angle other than zero degrees, 90 degrees or 180 degrees, the cumulative rotation angle increasing or decreasing monotonically as the number of circuits or round-trips increases; and
polarization maintaining means that maintains the polarization direction of the laser light through one resonator circuit or round-trip.

2. The laser oscillator according to claim 1, wherein the polarization maintaining means that maintains the polarization of light that has made one circuit or one round-trip of the optical path in the optical resonator comprises a polarizer located on the optical path of the resonator that determines the polarization direction.

3. The laser oscillator according to claim 1, wherein the polarization maintaining means that maintains the polarization of light that has made one circuit or one round-trip of the optical path in the optical resonator comprises a beam-splitter located on the optical path of the resonator, and a polarizer on the optical path split by the beam-splitter, or a solid-state uniaxial optical crystal laser medium, that determines the polarization direction.

4. The laser oscillator according to claim 1, wherein the polarization maintaining means that maintains the polarization of light that has made one circuit or one round-trip of the optical path in the optical resonator comprises a quarter-wave plate, a half-wave plate or a Faraday rotator provided on the optical path to adjust the polarization direction.

5. The laser oscillator according to claim 1, wherein a filter that blocks just light in a vicinity of an optical axis of the laser light is inserted into the optical path in the optical resonator of the laser oscillator.

* * * * *